United States Patent [19]
Hayasaki

[11] Patent Number: 5,665,028
[45] Date of Patent: Sep. 9, 1997

[54] SHIFT CAPACITY CONTROL FOR AUTOMATIC TRANSMISSION

[75] Inventor: Kouichi Hayasaki, Ebina, Japan

[73] Assignee: Nissan Motor Co., Ltd., Yokohama, Japan

[21] Appl. No.: 389,323

[22] Filed: Feb. 16, 1995

[30] Foreign Application Priority Data

Feb. 23, 1994 [JP] Japan .................. 6-025513
Mar. 3, 1994 [JP] Japan .................. 6-033711

[51] Int. Cl.⁶ ............................................. F16H 61/04
[52] U.S. Cl. .................. 477/143; 477/148; 477/158
[58] Field of Search ........................... 477/120, 143, 477/148, 156, 158, 154, 155, 160; 364/424.1

[56] References Cited

U.S. PATENT DOCUMENTS

| | | | |
|---|---|---|---|
| 4,551,802 | 11/1985 | Smyth | 477/78 X |
| 4,841,815 | 6/1989 | Takahashi | 477/143 X |
| 4,947,331 | 8/1990 | Speranza | 477/155 X |
| 4,981,053 | 1/1991 | Yamaguchi. | |
| 4,998,451 | 3/1991 | Sano | 477/143 X |
| 5,016,494 | 5/1991 | Yamaguchi | 477/107 X |
| 5,060,540 | 10/1991 | Yamaguchi | 477/154 |
| 5,063,814 | 11/1991 | Baba et al. | 477/154 X |
| 5,113,719 | 5/1992 | Suzuki et al. | 477/158 X |
| 5,165,308 | 11/1992 | Asada et al. | 477/154 |
| 5,389,050 | 2/1995 | Sakai et al. | 477/138 X |

FOREIGN PATENT DOCUMENTS 1-169164  7/1989  Japan .

*Primary Examiner*—Charles A. Marmor
*Assistant Examiner*—Peter T. Kwon
*Attorney, Agent, or Firm*—Foley & Lardner

[57] ABSTRACT

A shift capacity control system for an automatic transmission is constructed to determine a state of an engine speed difference after occurrence of a shift command, determine a propriety of a shift capacity of the automatic transmission in response to the state determined, and control an engagement capacity of a friction element to be operated during a period of shifting in response to the propriety determined.

60 Claims, 16 Drawing Sheets

SHIFT CAPACITY CONTROL FOR AUTOMATIC TRANSMISSION

BACKGROUND OF THE INVENTION

The present invention relates to a system for controlling a shift capacity of an automatic transmission, i.e. an engagement capacity of friction elements to be operated during shifting of the automatic transmission.

By selective hydraulic actuation or engagement of the friction elements such as a clutch, brake, etc. which determine a transmission route of a planetary gear, the automatic transmission selects a corresponding speed, and changes power out of an engine in accordance with the gear ratio corresponding thereto. Shifting of the automatic transmission from one speed to another is carried out by changing combination of the friction elements.

For this reason, if the engagement capacity of the friction elements engaged for this shifting is too large, great shift shock is produced by engagement of the friction elements. It is noted that the engagement capacity of the friction elements is determined by a working pressure thereof. Contrarily, if the engagement capacity of the friction elements is too small, slippage of the friction elements is produced, resulting in a decreased longevity of the automatic transmission. It is thus understood that the engagement capacity of the friction elements in particular during shifting, i.e. the shift capacity of the automatic transmission should be controlled appropriately. In view of such circumstances, a technique of controlling a line pressure serving as a source pressure of the whole automatic transmission has been proposed as shown, for example, in JP-A 1-169164.

According to this, a time that the effective gear ratio indicated by the ratio of input revolution to output revolution of the planetary gear changes from a value before shifting to a value after shifting, i.e. an inertia phase time, is measured, and the line pressure is controlled based on self-learning so that the inertia phase time has an optimum value in terms of countermeasures against shift shock.

With such conventional shift capacity control system, when involvement of the friction elements is unpreferable at an initial stage of engagement, which tends to occur when the friction element is a band brake, shorter inertia phase time is measured, which results in judgment that the line pressure is too high, i.e. the shift capacity is too large, carrying out control for decreasing the line pressure. However, since unpreferable involvement of the friction elements means insufficient shift capacity, a continuous decrease in the line pressure or shift capacity based on such erroneous judgment of the shift capacity comes to finally a lower limit value, producing impossible control.

Likewise, when shifting of the automatic transmission is extended since a shelf value of a second speed selecting pressure is low due to low line pressure, shorter inertia phase time is measured, which results in judgment that the line pressure is too high, i.e. the shift capability is too large, carrying out control for decreasing the line pressure. However, since the low shelf value of the second speed selecting pressure means insufficient shift capacity, a continuous decrease in the line pressure or shift capacity based on such erroneous judgment of the shift capacity comes to finally a lower limit value, producing impossible control.

It is, therefore, an object of the present invention to provide a shift capacity control system for an automatic transmission which allows appropriate control of the shift capacity thereof.

SUMMARY OF THE INVENTION

According to one aspect of the present invention, there is provided a system for controlling a shift capacity of an automatic transmission for a prime mover, the automatic transmission having a speed determined by selective engagement of friction elements, the system comprising:

means for sensing a revolution of the prime mover and generating a revolution signal indicative of said revolution sensed;

means for sensing a command for changing the speed of the automatic transmission and generating a command signal indicative of said command sensed;

means for determining a state of a time variation in said revolution of the prime mover after said command signal is generated and generating a state signal indicative of said state determined;

means for determining a propriety of the shift capacity of the automatic transmission in response to said state signal and generating a propriety signal indicative of said propriety determined; and means for controlling an engagement capacity of the friction element to be operated during a period of shifting of the automatic transmission in response to said propriety signal.

According to another aspect of the present invention, there is provided a method of controlling a shift capacity of an automatic transmission for a prime mover, the automatic transmission having a speed determined by selective engagement of friction elements, the method comprising the steps of:

sensing a revolution of the prime mover and generating a revolution signal indicative of said revolution sensed;

sensing a command for changing the speed of the automatic transmission and generating a command signal indicative of said command sensed;

determining a state of a time variation in said revolution of the prime mover after said command signal is generated and generating a state signal indicative of said state determined;

determining a propriety of the shift capacity of the automatic transmission in response to said state signal and generating a propriety signal indicative of said propriety determined; and controlling an engagement capacity of the friction element to be operated during a period of shifting of the automatic transmission in response to said propriety signal.

DETAILED DESCRIPTION OF THE INVENTION

Figure 1:
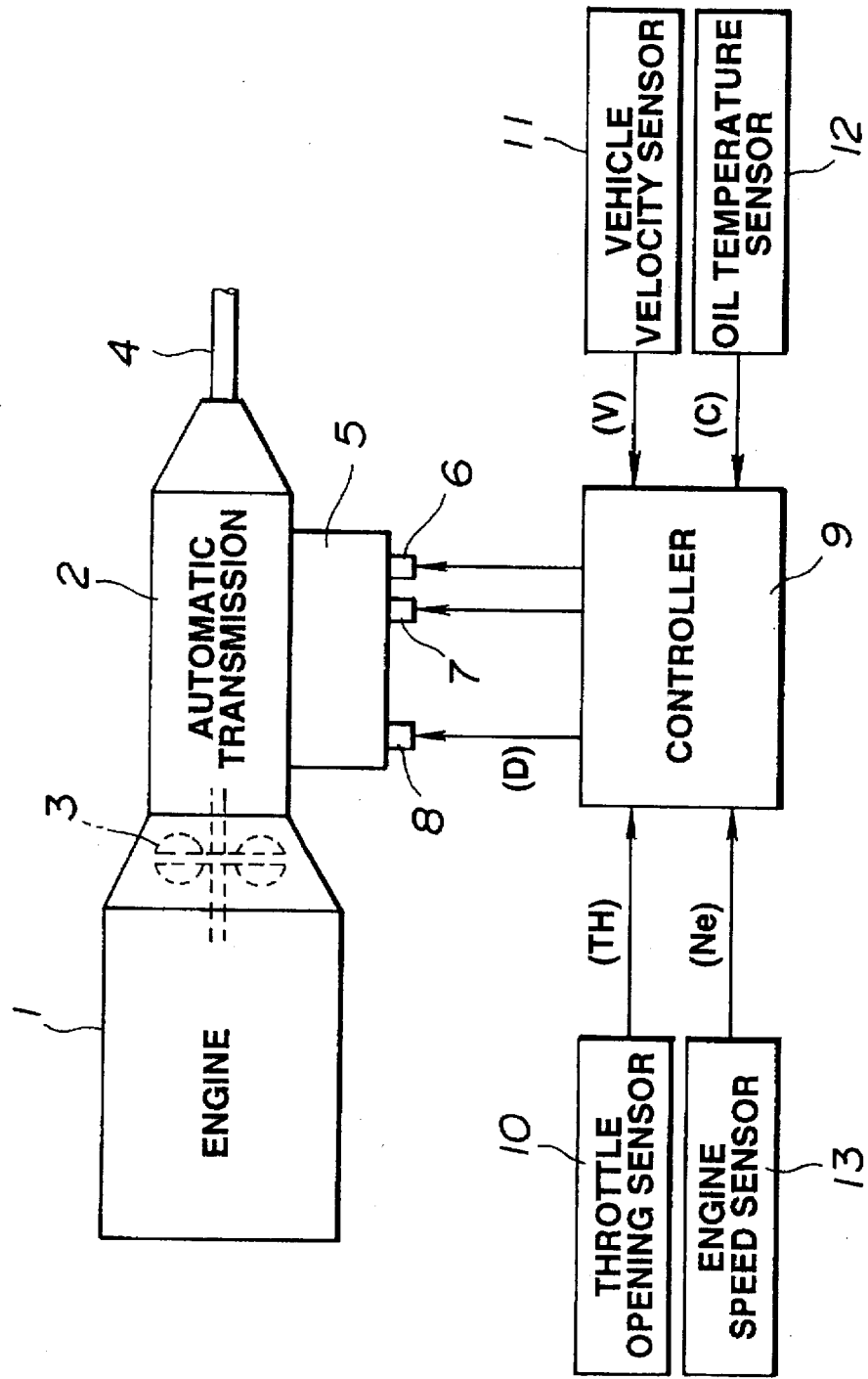
FIG. 1 is a block diagram showing a first preferred embodiment of a shift capacity control system for an automatic transmission according to the present invention.

Referring to the drawings wherein like reference numerals designate like parts throughout the views, preferred embodiments of a shift capacity control system for an automatic transmission will be described.

FIGS. 1–7D show a first preferred embodiment of the present invention. Referring to FIG. 1, an engine or prime mover, generally designated by reference numeral 1, provides power to an automatic transmission 2 through a torque converter 3. The automatic transmission 2 changes input rotation in the gear ratio in accordance with a selected speed, which is transmitted to an output shaft 4.

The automatic transmission 2 has a selected speed determined by selective hydraulic actuation or engagement of a plurality of friction elements based on combination of ON/OFF of shift solenoids 6, 7 in a control valve 5. The torque converter 3 is put in the converter state that input and output elements fail to directly be coupled together or the lockup state that the input and output elements are directly coupled together by duty control of a lockup solenoid 8 in the control valve 5.

An ON/OFF operation of the shift solenoids 6, 7 and a drive duty D of the lockup solenoid 8 are controlled by a controller 9. The controller 9 inputs a signal from a throttle opening sensor 10 for sensing a throttle opening TH of the engine 1 or engine load, a signal from a vehicle velocity sensor 11 for sensing a vehicle velocity V out of a revolution of the transmission output shaft 4, a signal from an oil temperature sensor 12 for sensing a temperature C of transmission hydraulic fluid, and a signal from an engine speed sensor 13 for sensing an engine speed $N_e$.

Based on the above input information, the controller 9 carries out shift control and lockup control in accordance with a well-known computing (not shown). As to shift control, the controller 9 looks for an optimum speed in the actual cruising state of a motor vehicle out of the throttle opening TH sensed by the throttle opening sensor 10 and the vehicle velocity V sensed by the vehicle velocity sensor 11 and in accordance with a look-up operation of table data corresponding to a shift diagram as previously established, and turns on and off the shift solenoids 6, 7 to select the optimum speed. The friction elements determined by combination of ON/OFF of the shift solenoids 6, 7 are supplied with a line pressure, and engaged with each other, carrying out shifting of the automatic transmission 2 from an actual speed to the optimum speed.

As to lockup control, the controller 9 judges in which area the cruising state of the motor vehicle is found, in a lockup area or a converter area, in accordance with a look-up operation of table data corresponding to a lockup diagram as previously established and based on the throttle opening TH and the vehicle velocity V, and puts according to a result of judgment the torque converter 3 in the lockup state or the converter state through duty control of the lockup solenoid 8. The lockup state of the torque converter 3 is achieved when the drive duty D of the lockup solenoid 8 is 95%, whereas the converter state of the torque converter 3 is achieved when the drive duty D of the lockup solenoid 8 is 5%.

Moreover, the controller 9 executes control programs as shown in FIGS. 2–5 every occurrence of a shift command from the actual speed to the optimum speed so as to carry out the following shift capacity propriety judgment and shift capacity self-learning control upon shifting of the automatic transmission 2.

Figure 2:
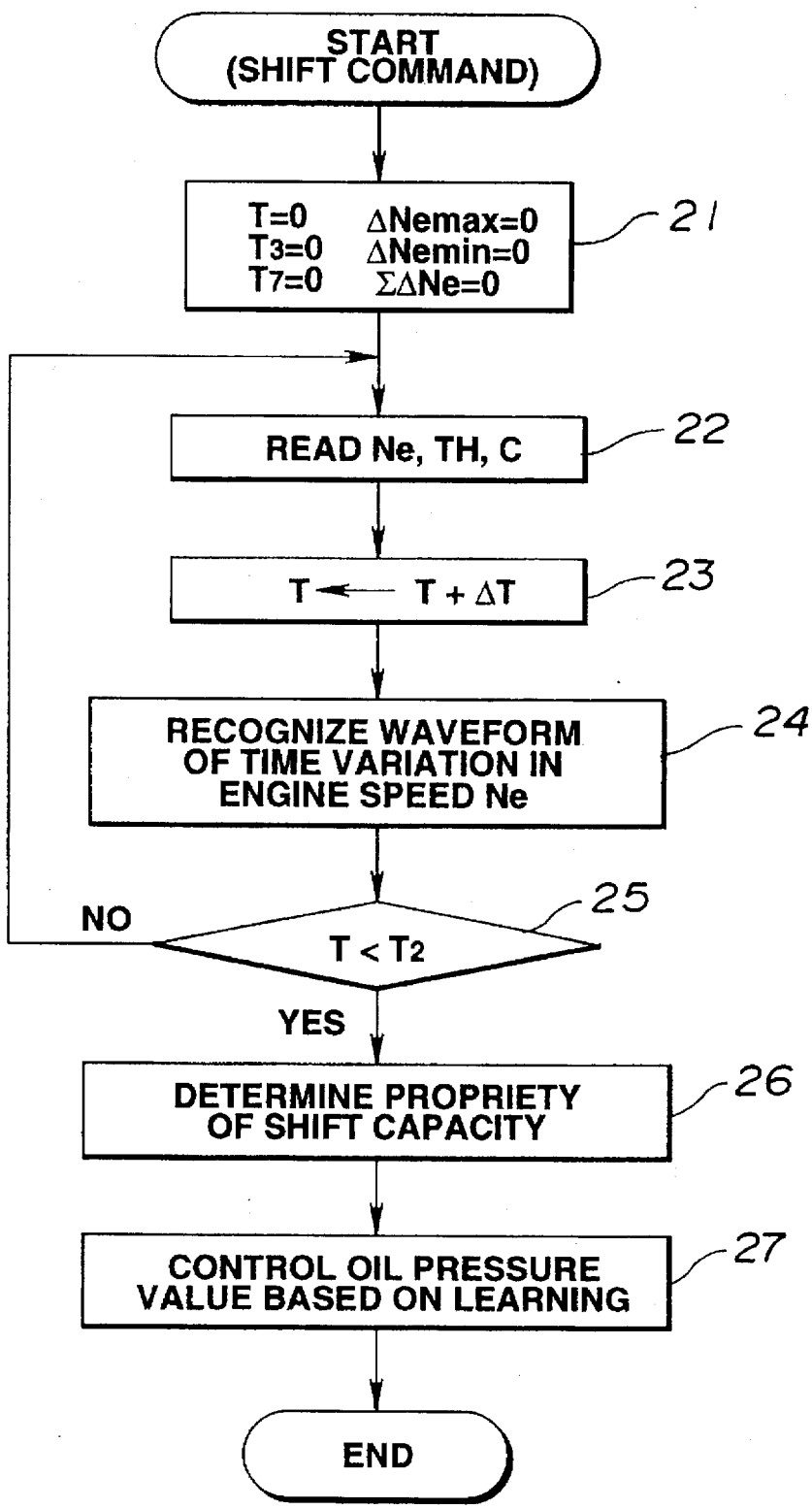
FIG. 2 is a flowchart showing a main routine of shift capacity control in the first preferred embodiment.

FIG. 2 shows a main routine started every occurrence of a shift command. First, at a step 21, timers of T, $T_3$, $T_7$ as will be described later are reset to 0, respectively, and data values $\Delta N_{emax}$, $\Delta N_{emin}$, $\Sigma \Delta N_e$ as will be described later are reset to 0, respectively. At a step 22, the engine speed $N_e$ sensed by the engine speed sensor 13, the throttle opening TH sensed by the throttle opening sensor 10, and the transmission hydraulic fluid temperature C sensed by the oil temperature sensor 12 are read in a memory. At a step 23, the timer of T is incremented by $\Delta T$ ($T \leftarrow T+\Delta T$), through which an elapsed time (refer hereafter to as T) after occurrence of a shift command is measured.

Figure 3:
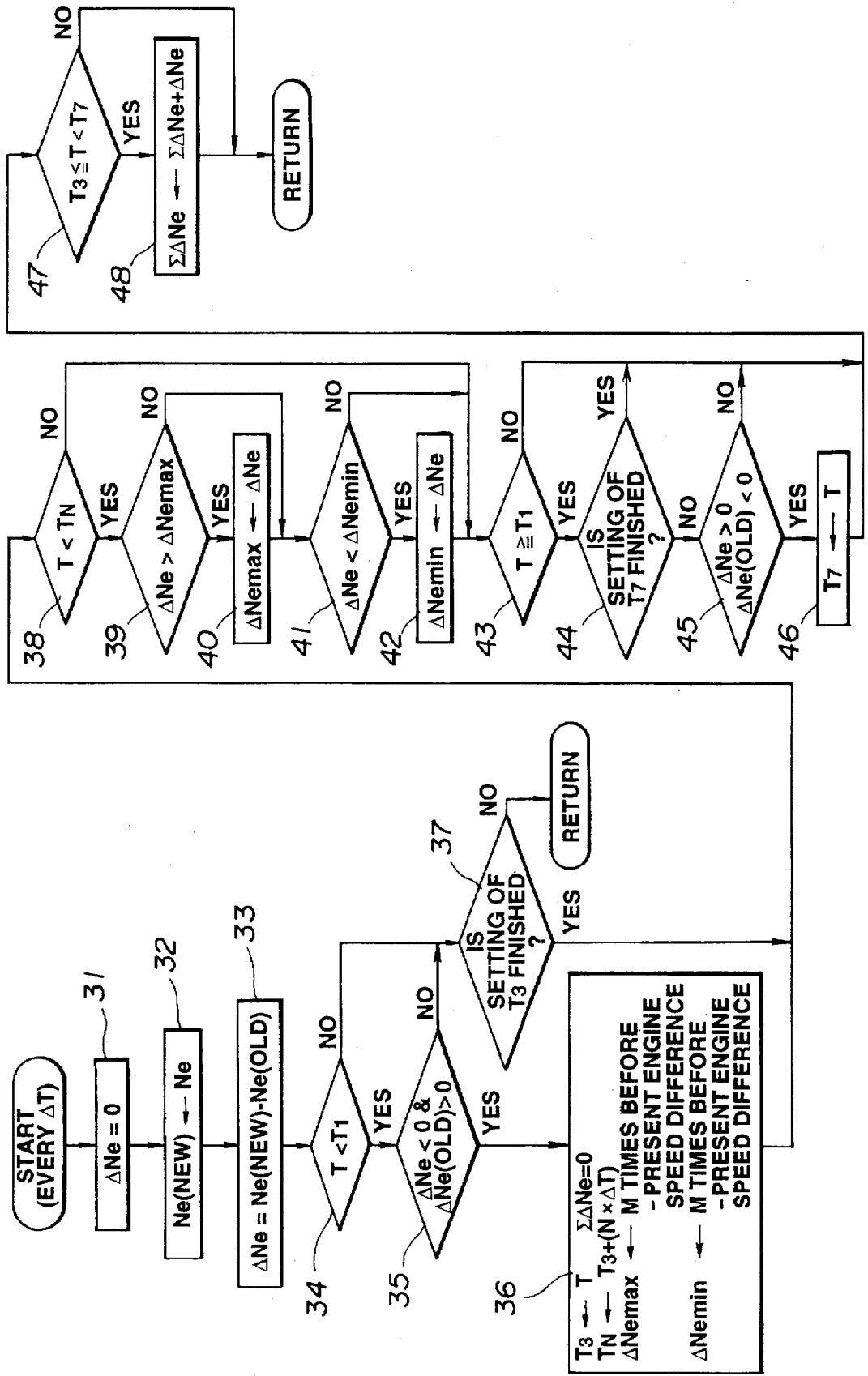
FIG. 3 is a view similar to FIG. 2, showing a subroutine for recognizing waveform of a time variation in the engine speed difference.
Figure 6:
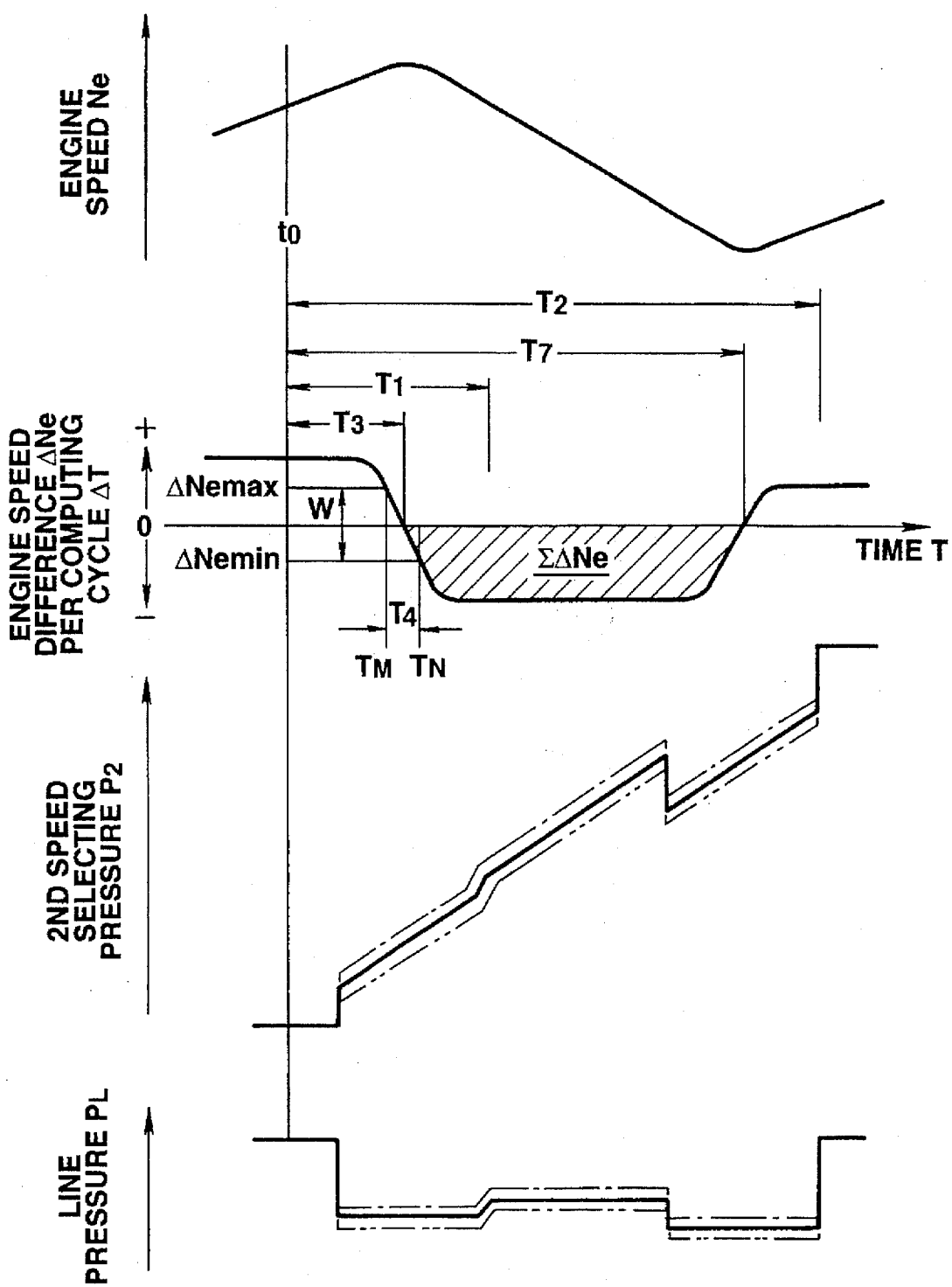
FIG. 6 is a time chart showing the method of recognizing waveform of a time variation in the engine speed difference together with self-learning control forms of hydraulic pressures.

At a subsequent step 24, a waveform of a time variation in the engine speed $N_e$ as illustrated in FIG. 6 is recognized according to the control program as shown in FIG. 3. The steps 22–24 are continued until it is judged that the elapsed time T after occurrence of a shift command is equal to a set time $T_2$ covering a length from occurrence of a shift command to shift completion, and therefore, waveform recognition at the step 24 is executed every predetermined time $\Delta T$ at the step 23 until T is equal to or greater than $T_2$ ($T \geq T_2$) after occurrence of a shift command. Specifically, waveform recognition at the step 24 is as shown in FIG. 3.

Figure 4:
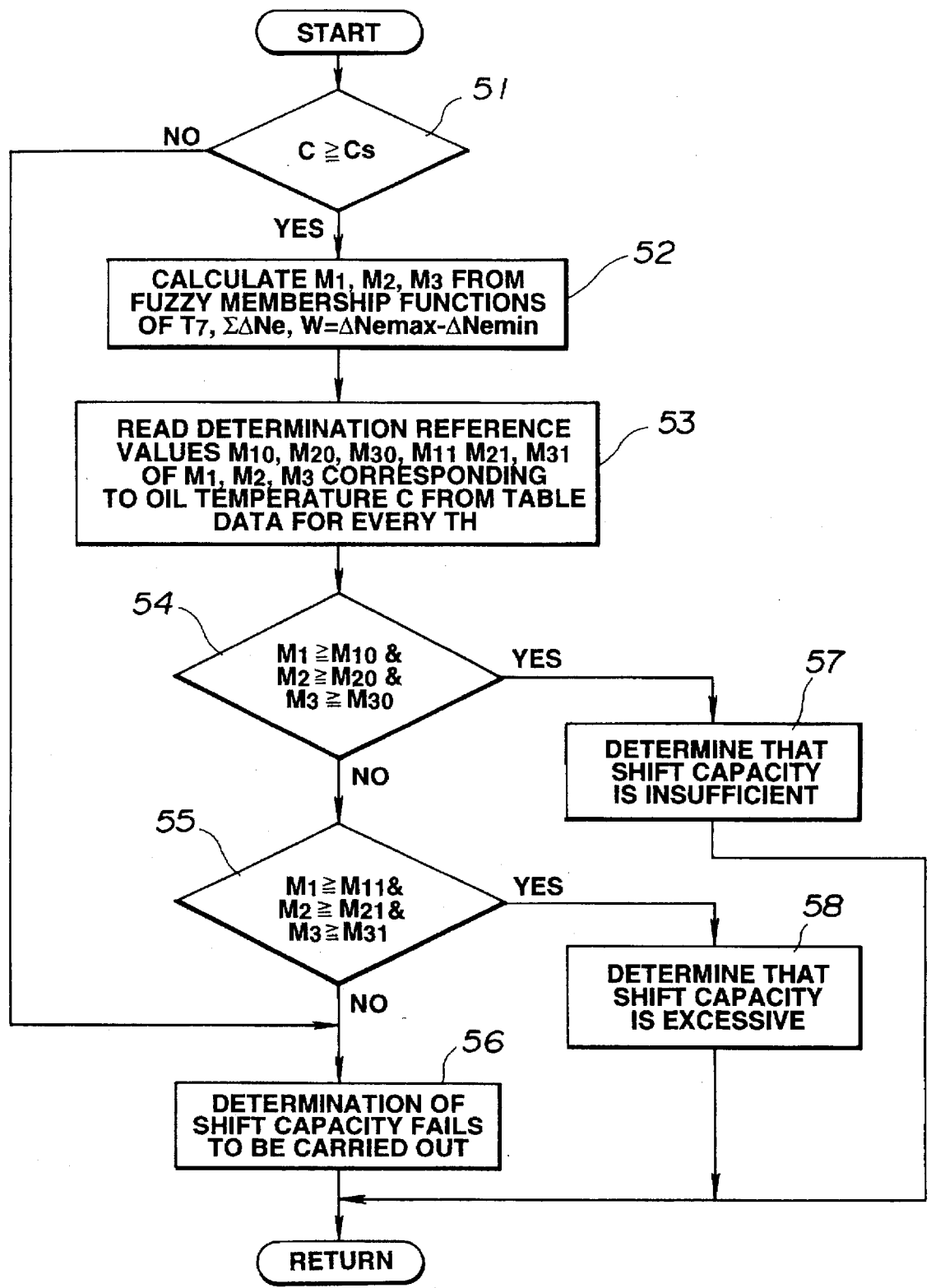
FIG. 4 is a view similar to FIG. 3, showing a subrouting for judging the propriety of a shift capacity.
Figure 5:
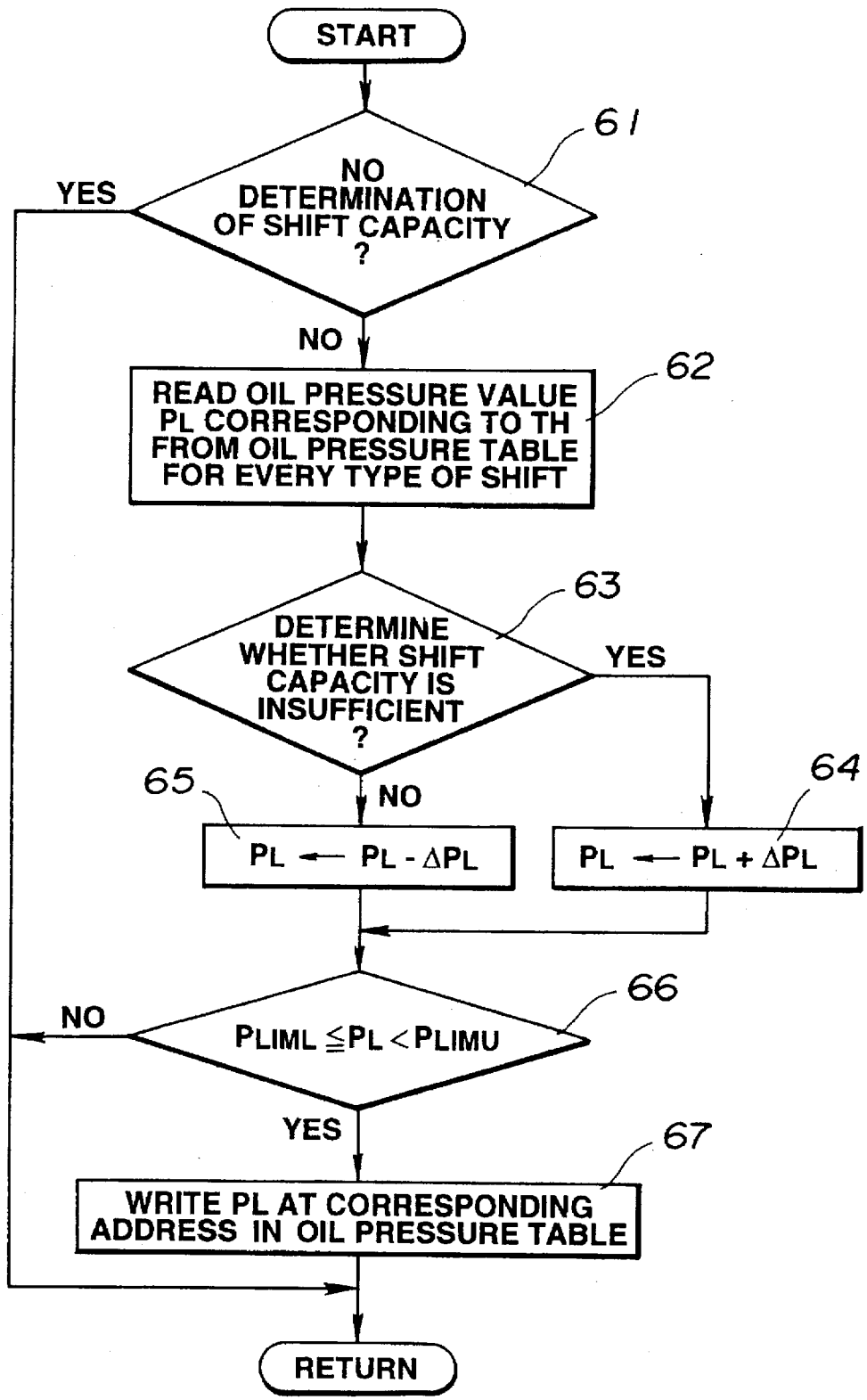
FIG. 5 is a view similar to FIG. 4, showing a subrouting for self-learning control of a line pressure.

When $T \geq T_2$ after occurrence of a shift command, propriety judgment of a shift capacity is carried out at a step 26 according to the control program as shown in FIG. 4, and self-learning control of a hydraulic pressure value for shift capacity control based on a result of propriety judgment is carried out at a step 27 according to the control program as shown in FIG. 5.

Figure 9:
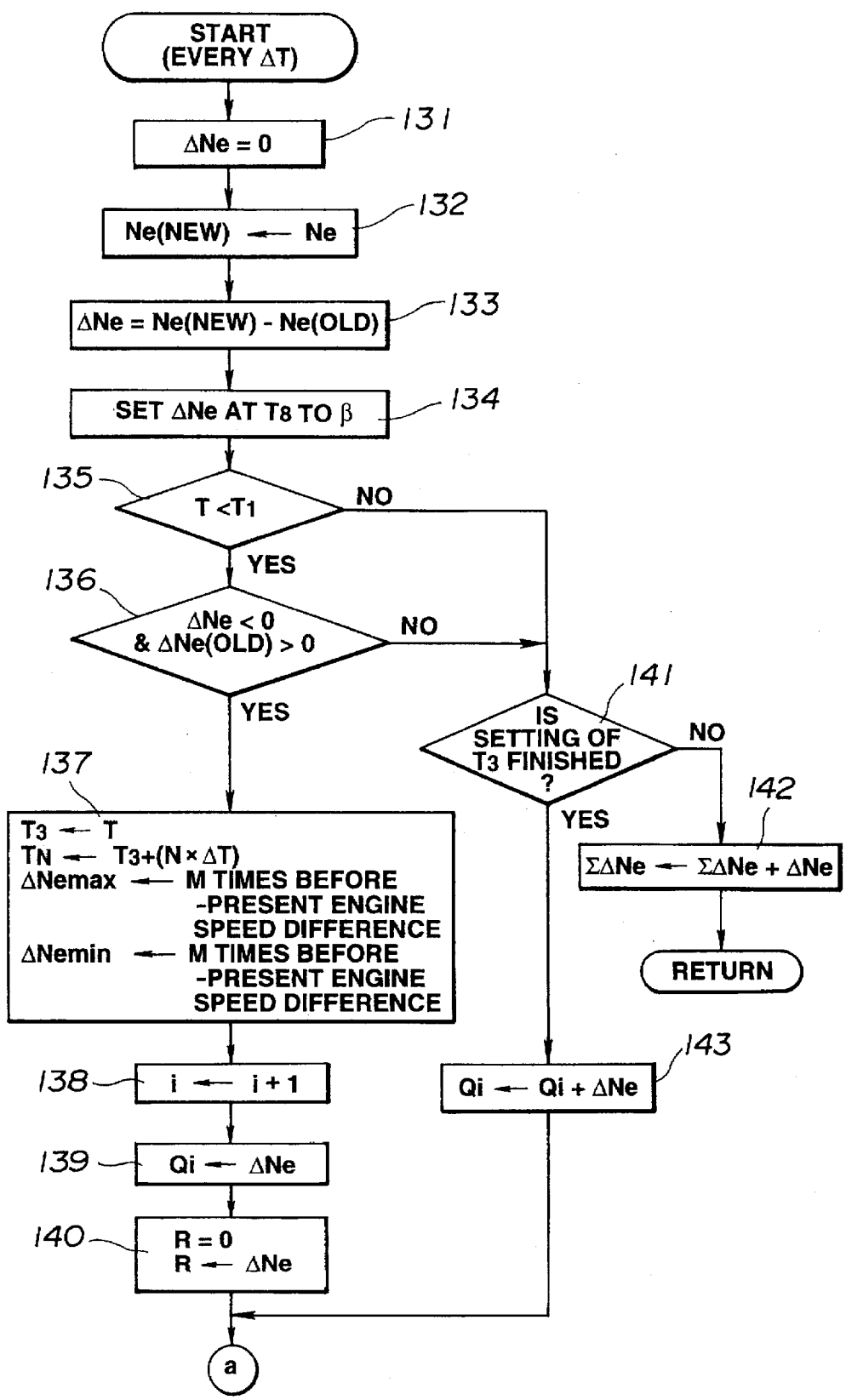
FIGS. 9–11 are views similar to FIG. 8, showing a subroutine for recognizing waveform of a time variation in the engine speed difference.

Referring to FIG. 6, a description will be made with regard to waveform recognition executed at the step 24 as shown in FIG. 9. Here, in accordance with a shift command at a point $t_0$, the engine speed or prime mover revolution $N_e$ is varied as shown in FIG. 6 during shifting, having an engine speed difference $\Delta N_e$ per computing cycle $\Delta T$ in FIG. 3 (step 24), i.e. a time variation in the engine speed $N_e$, as shown in FIG. 6.

In this embodiment, waveform recognition is carried out by:

1) a length of a shift required time $T_7$ between the shift command point $t_0$ and a point that the engine speed difference $\Delta N_e$ is changed from the negative to the positive for the first time after a lapse of a first set time $T_1$ covering a length from the shift command point $t_0$ to shift commencement and not to shift completion, and before a lapse of a second set time $T_2$ covering shift completion;

2) a sum $\Sigma \Delta N_e$ of the engine speed difference $\Delta N_e$ (substantially equal to an area of a shadowed portion in FIG. 6) between a point that the engine speed difference $\Delta N_e$ is changed from the positive to the negative for the last time within the first set time $T_1$ covering a length from the shift command point $t_0$ to shift commencement and not to shift completion, i.e. a point of $T_3$ in terms of an elapsed time after the shift command point $t_0$, and a point that the engine speed difference $\Delta N_e$ is changed from the negative to the positive for the first time before a lapse of the second set time $T_2$ covering a length from the shift command point $t_0$ to shift completion, i.e. a point of $T_7$ in terms of an elapsed time after the shift command point $t_0$; and 3) an incline $W/T_4$ of the engine speed difference $\Delta N_e$ in the vicinity of the point that the engine speed difference $\Delta N_e$ is changed from the positive to the negative for the last time within the first set time $T_1$ covering a length from the shift command point $t_0$ to shift commencement.

The incline $W/T_4$ is a ratio of a time $T_4$ between a point $T_M$ before M times and a point $T_N$ after N times in view of a reference point that the time $T_3$ elapsed after the shift command point $t_0$ to a difference W between a maximum value $\Delta N_{emax}$ and a minimum value $\Delta N_{emin}$ of the engine speed difference $\Delta N_e$ during the Time $T_4$. Preferably, the first and second set times $T_1$, $T_2$ are varied in accordance with the throttle opening TH which participates in a shift operation.

It is presumed that when the shift required time $T_7$ is longer, the shift capacity or hydraulic pressure is rather insufficient, that when the sum $\Sigma \Delta N_e$ of the engine speed difference $\Delta N_e$ is smaller, the shift capacity or hydraulic pressure is rather insufficient, and that when the incline $W/T_4$ of the engine speed difference $\Delta N_e$ is gentler, the shift capacity or hydraulic pressure is rather insufficient.

Based on the above logic, upon waveform recognition as shown in FIG. 3, at a step 31, the engine speed difference $\Delta N_e$ is reset to 0 prior to calculation thereof. At a step 32, an engine speed read value $N_e$ is set to a present engine speed value $N_e$(NEW), and at a step 33, the engine speed difference $\Delta N_e$ is obtained by subtracting a previous engine speed value $N_e$(OLD) from the present engine speed value $N_e$(NEW). The engine speed difference $\Delta N_e$ is obtained every computing cycle $\Delta T$ as shown in FIG. 3. The engine speed difference $\Delta N_e$ is a value per predetermined time $\Delta T$, thus corresponding to a time variation in the engine speed or prime mover revolution.

At a subsequent step 34, it is checked whether or not the elapsed time T after occurrence of a shift command is less than the first set time $T_1$. During judgment of $T<T_1$ at the step 34, a step 36 is executed only once at a point that it is judged that the present engine speed difference $\Delta N_e$ is negative whereas the previous engine speed difference $\Delta N_e$ (OLD) is positive at a step 35, i.e. a point that it is judged that the engine speed difference $\Delta N_e$ is changed from the positive to the negative. At the step 36, a value of the timer of T at the above point is set in the timer of $T_3$, and the sum $\Sigma \Delta N_e$ of the engine speed difference $\Delta N_e$ is reset to 0 for the sake of subsequent calculation. Moreover, referring to FIG. 6, the time $T_N$ indicative of a computing point after N times from the above point is obtained by a formula $T_3+(N \times \Delta T)$, and the maximum value $\Delta N_{emax}$ and minimum value $\Delta N_{emin}$ of the engine speed difference $\Delta N_e$ are stored in the memory in going back to the computing point $T_M$ before M times from the present.

Except for the point that it is judged at the step 35 that the engine speed difference $\Delta N_e$ is changed from the positive to the negative, control proceeds to a step 37 where it is checked whether or not setting of the timer of $T_3$ is finished at the step 36. If setting of the timer of $T_3$ is not finished, control returns to the main routine in FIG. 2, whereas if it is finished, control proceeds to a step 38 where it is checked whether or not the elapsed time T after occurrence of a shift command is within the $T_N$.

While the elapsed time T after occurrence of a shift command is within the $T_N$, at steps 39–42, the maximum value $\Delta N_{emax}$ and minimum value $\Delta N_{emin}$ of the engine speed difference $\Delta N_e$ during the time $T_4$ in FIG. 6 are obtained in updating the maximum value $\Delta N_{emax}$ and minimum value $\Delta N_{emin}$ to the present engine speed difference $\Delta N_e$ in accordance with comparison with the present engine speed difference $\Delta N_e$, if necessary.

At subsequent steps 43–46, during a period after the elapsed time T after occurrence of a shift command is more than the first set time $T_1$ and before setting of the timer of $T_7$ is carried out, it is judged whether or not the present engine speed difference $\Delta N_e$ is positive, and the previous engine speed difference value $\Delta N_e$(OLD) is negative, i.e. it is judged whether or not the engine speed difference $\Delta N_e$ is changed from the negative to the positive, and a value of the timer T is set in the timer of $T_7$ at a point that this change occurs.

At subsequent steps 47–49, the sum $\Sigma \Delta Ne$ of the engine speed difference $\Delta N_e$ corresponding to an area of the shadowed portion in FIG. 6 is calculated by adding the engine speed difference $\Delta N_e$ while the elapsed time T after occurrence of a shift command is between the above set values of the timers of $T_3$ and $T_7$.

The step 26 in FIG. 2 executes the control program as shown in FIG. 4 based on the above waveform recognition so as to judge the propriety of the shift capacity. First, at a step 51, it is judged whether or not the transmission hydraulic fluid temperature C is higher than a set temperature Cs. If the transmission hydraulic fluid temperature C is not higher than the set temperature Cs, unstable engine output torque or unstable operation of the automatic transmission 2 appears, resulting in inaccurate propriety judgment of the shift capacity. Thus, without carrying out propriety judgment of the shift capacity, control proceeds to a step 56. On the other hand, if the transmission hydraulic fluid temperature C is higher than the set temperature Cs, propriety judgment of the shift capacity is carried out at steps 52–55.

Figure 7A:
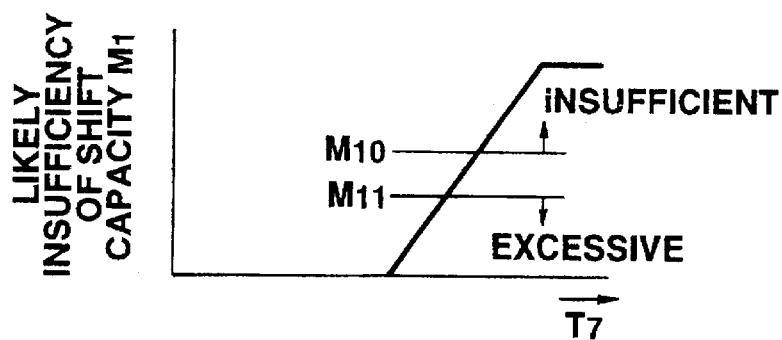
FIGS. 7A–7D are diagrammatic views illustrating fuzzy membership functions for use on judgment of the propriety of the shift capacity upon shift capacity control.
Figure 7B:
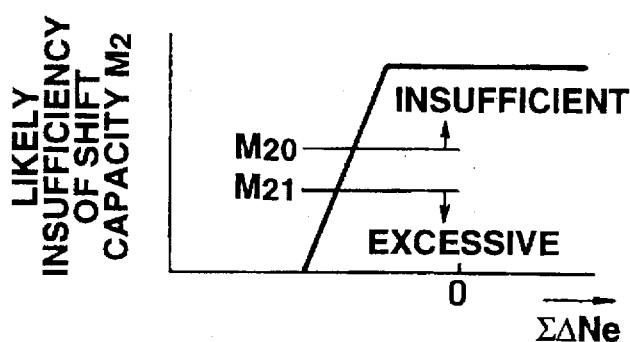
Figure 7C:
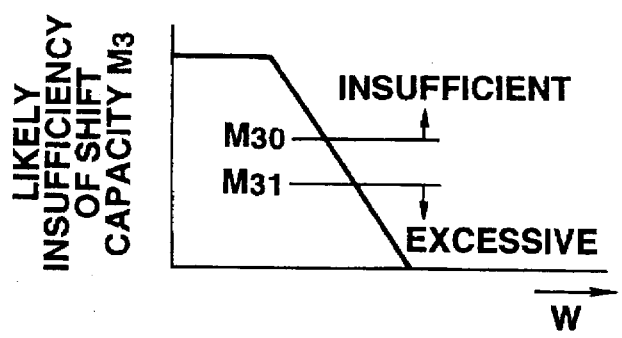

Upon propriety judgment of the shift capacity, fuzzy membership functions concerning the shift required time $T_7$, the sum $\Sigma \Delta Ne$ of the engine speed difference $\Delta N_e$, and the difference $W=\Delta N_{emax}-\Delta N_{emin}$ in FIG. 6 are previously established as shown in FIGS. 7A–7C. It is noted that the form of the fuzzy membership functions is experimentally determined every throttle opening TH or engine load in changing operating conditions of the automatic transmission 2 in various ways.

At the step 52 in FIG. 4, likely insufficiencies $M_1$, $M_2$, $M_3$ of the shift capacity are obtained out of the fuzzy membership functions concerning the shift required time $T_7$, the sum ΣΔNe of the engine speed difference $\Delta N_e$, and the difference $W=\Delta N_{emax}-\Delta N_{emin}$ as illustrated in FIGS. 7A–7C. At the subsequent step 53, insufficiency reference values $M_{10}$, $M_{20}$, $M_{30}$ for previously judging that the shift capacity is likely insufficient with respect to the respective fuzzy membership functions and excess reference values $M_{11}$, $M_{21}$, $M_{31}$ for previously judging that the shift capacity is likely excessive with respect to the respective fuzzy membership functions are read in the memory as illustrated in FIGS. 7A–7C. It is noted that the insufficiency reference values $M_{10}$, $M_{20}$, $M_{30}$ and excess reference values $M_{11}$, $M_{21}$, $M_{31}$ are previously established every throttle opening TH as table data of the transmission hydraulic fluid temperature C, and are obtained out of the transmission hydraulic fluid temperature C and the throttle opening TH in accordance with the table data.

At the subsequent step 54, it is checked whether or not the shift capacity is insufficient based on judgment of $M_1 \geq M_{10}$, and $M_2 \geq M_{20}$, and $M_3 \geq M_{30}$. At the step 55, it is checked whether or not the shift capacity is excessive based on judgment of $M_1 < M_{11}$, and $M_2 < M_{21}$, and $M_3 < M_{31}$. If both results of judgment at the steps 54 and 55 are NO, the likely insufficiencies $M_1$, $M_2$, $M_3$ of the shift capacity are found between the corresponding insufficiency reference values and the corresponding excess reference values, respectively, so that control proceeds to a step 58 without carrying out judgment of the shift capacity.

At the step 54, if it is judged that $M_1 \geq M_{10}$, and $M_2 \geq M_{20}$, and $M_3 \geq M_{30}$, control proceeds to a step 57 where a result of judgment is output that the shift capacity is insufficient. At the step 55, if it is judged that $M_1 < M_{11}$, and $M_2 < M_{21}$, and $M_3 < M_{31}$, control proceeds to a step 58 where a result of judgment is output that the shift capacity is excessive.

Figure 7D:
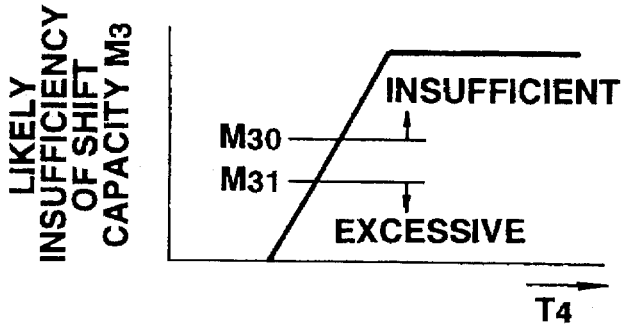
Figure 8:
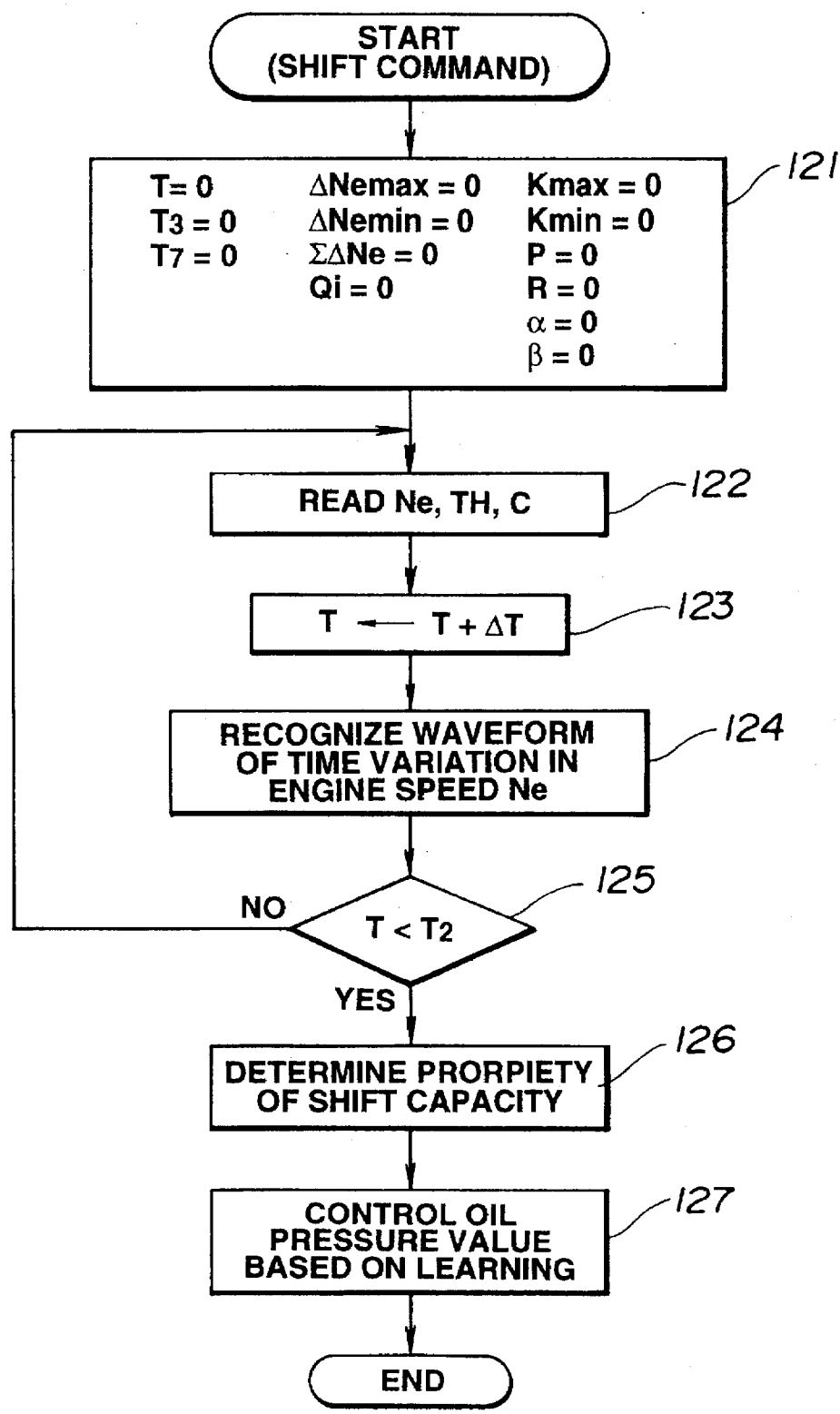
FIG. 8 is a view similar to FIG. 5, showing a main routine of shift capacity control in a second preferred embodiment.

It is noted that FIG. 7C shows a fuzzy membership function concerning the difference W between the maximum value $\Delta N_{emax}$ and minimum value $\Delta N_{emin}$ of the engine speed difference $\Delta N_e$ during the predetermined time $T_4$ in FIG. 8, i.e. the incline of the engine speed difference $\Delta N_e$ in the vicinity of the point after a lapse of the time $T_3$. If W is put constant, and the time $T_4$ is measured with respect to this, the incline can be also expressed by the time $T_4$ as measured, so that the fuzzy membership function as shown in FIG. 7C may be replaced with that one concerning the time $T_4$ as shown in FIG. 7D.

Based on the above results of shift capacity judgment, at the step 27 in FIG. 2, the control program as shown in FIG. 5 is executed to carry out self-learning control of a line pressure value, maintaining the shift capacity at an appropriate value. This self-learning control is carried out as follows if it is judged that judgment of the shift capacity is found at a step 81 in FIG. 8, i.e. the step 57 or 58 is executed without executing the step 56 in FIG. 4:

At a step 62, a line pressure value $P_L$ corresponding to the throttle opening TH is read in the memory in accordance with a hydraulic pressure table established every type of shifting, e.g. shifting from the first speed to the second speed. At a subsequent step 63, it is checked whether judgment is that the shift capacity is insufficient, or that the shift capacity is excessive. If judgment is that the shift capacity is insufficient, control proceeds to a step 64 where the line pressure value $P_L$ is increased by a predetermined amount $\Delta P_L$, whereas if judgment is that the shift capacity is excessive, control proceeds to a step 65 where the line pressure $P_L$ is decreased by a predetermined amount $\Delta P_L$. Then, at a step 66, it is judged whether or not the line pressure value $P_L$ as corrected is found between an allowable lower limit value $P_{LIML}$ and an allowable upper limit value $P_{LIMU}$. If a result of judgment at the step 66 is YES, control proceeds to a step 67 where the line pressure value $P_L$ is rewritten at a corresponding address in the hydraulic pressure table.

Thus, referring to FIG. 6, next shifting of the same type and with the same throttle opening TH is carried out with the line pressure value $P_L$ as updated as indicated by a one-dot chain line or a two-dot chain line, so that the working pressure of the friction elements or second speed selecting pressure $P_2$ in FIG. 6 is changed from a value as indicated by a fully drawn line to a value as indicated by the one-dot chain line or the two-dot chain line, permitting control of the shift capacity at an appropriate value.

It is noted that upon control of the shift capacity, in place of adjustment of the value $P_L$ of the line pressure as a source pressure of the whole automatic transmission 2 as described in this embodiment, only a corresponding working pressure of the friction element can be controlled directly by adjustment of a back pressure of an accumulator arranged in an engaging pressure circuit of each friction element.

It is also noted that upon propriety judgment of the shift capacity, in place of the method at the steps 54 and 55, the following two methods can be adopted. One is such that when one or two of $M_1 \geq M_{10}$, $M_2 \geq M_{20}$ and $M_3 \geq M_{30}$ are established, and one of $M_1 < M_{11}$, $M_2 < M_{21}$ and $M_3 < M_{31}$ fails to be established among the remainder, a result of judgment is output that the shift capacity is insufficient, whereas when the reverse relationship is established, a result of judgment is output that the shift capacity is excessive. Another is such that when $M_1 \times M_2 \times M_3$ is greater than an insufficiency judgment reference value, a result of judgment is output that the shift capacity is insufficient, whereas when $M_1 \times M_2 \times M_3$ is smaller than an excess judgment reference value, a result of judgment is output that the shift capacity is excessive.

FIGS. 8–16E show a second preferred embodiment of the present invention. In this embodiment, the controller 9 executes control programs as shown in FIGS. 8–13 every occurrence of a shift command from the actual speed to the optimum speed so as to carry out the following shift capacity propriety judgment and shift capacity self-learning control upon shifting of the automatic transmission 2.

FIG. 8 shows a main routine started every occurrence of a shift command. First, at a step 121, timers of T, $T_3$, $T_7$ as will be described later are reset to 0, respectively, and data values $\Delta N_{emax}$, $\Delta N_{emin}$, $\Sigma \Delta N_e$, $Q_i$, $K_{max}$, $K_{min}$, P, R, $\alpha$, $\beta$ as will be described later are reset to 0, respectively. At a step 122, the engine speed $N_e$ sensed by the engine speed sensor 13, the throttle opening TH sensed by the throttle opening sensor 10, and the transmission hydraulic fluid temperature C sensed by the oil temperature sensor 12 are read in the memory. At a step 128, the timer of T is incremented by $\Delta T$ ($T \leftarrow T+\Delta T$), through which the elapsed time T after occurrence of a shift command is measured.

Figure 10:
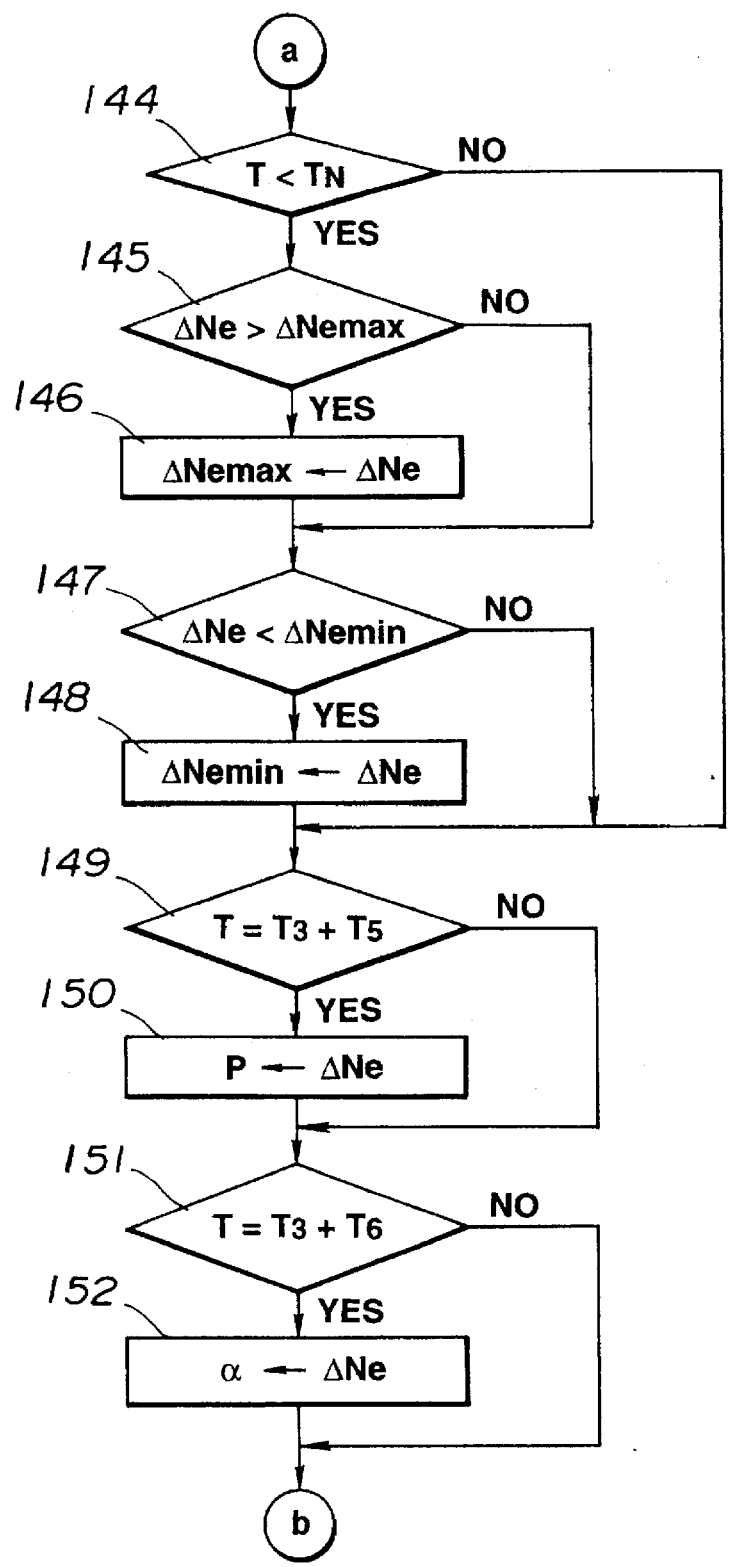
Figure 11:
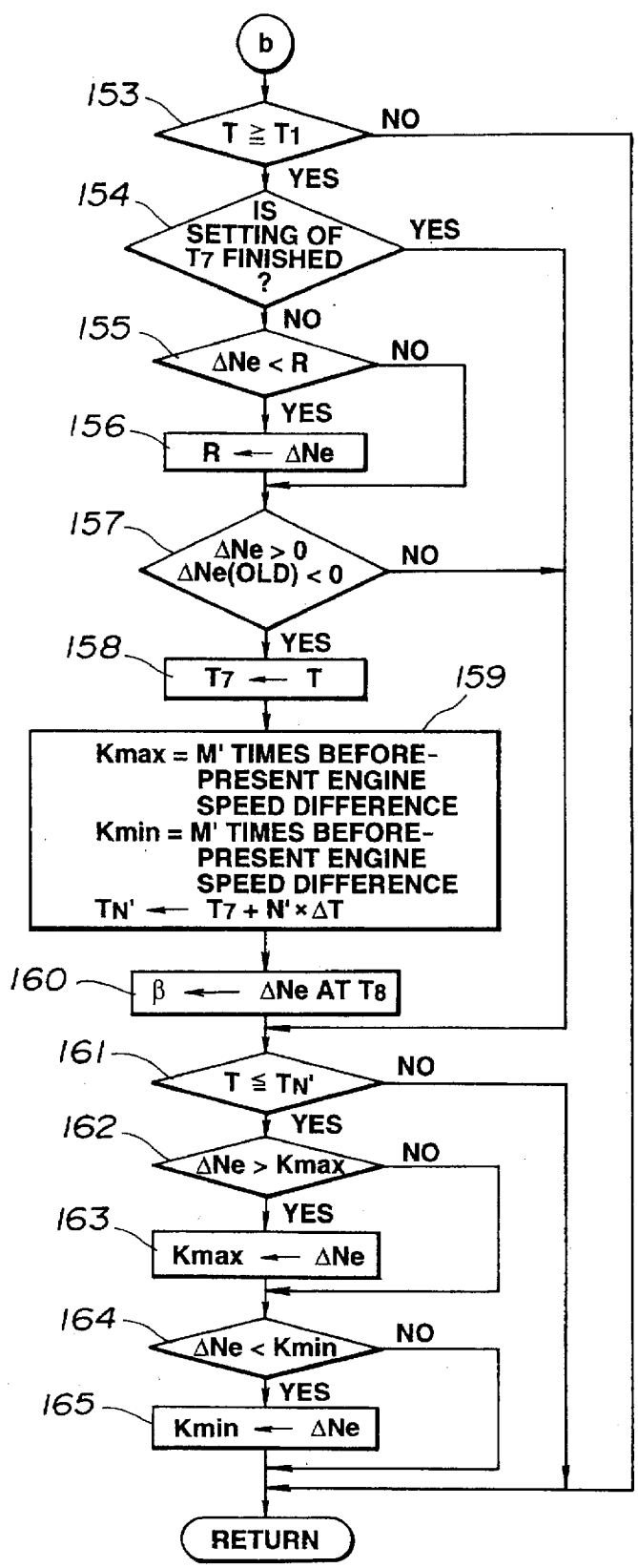
Figure 14:
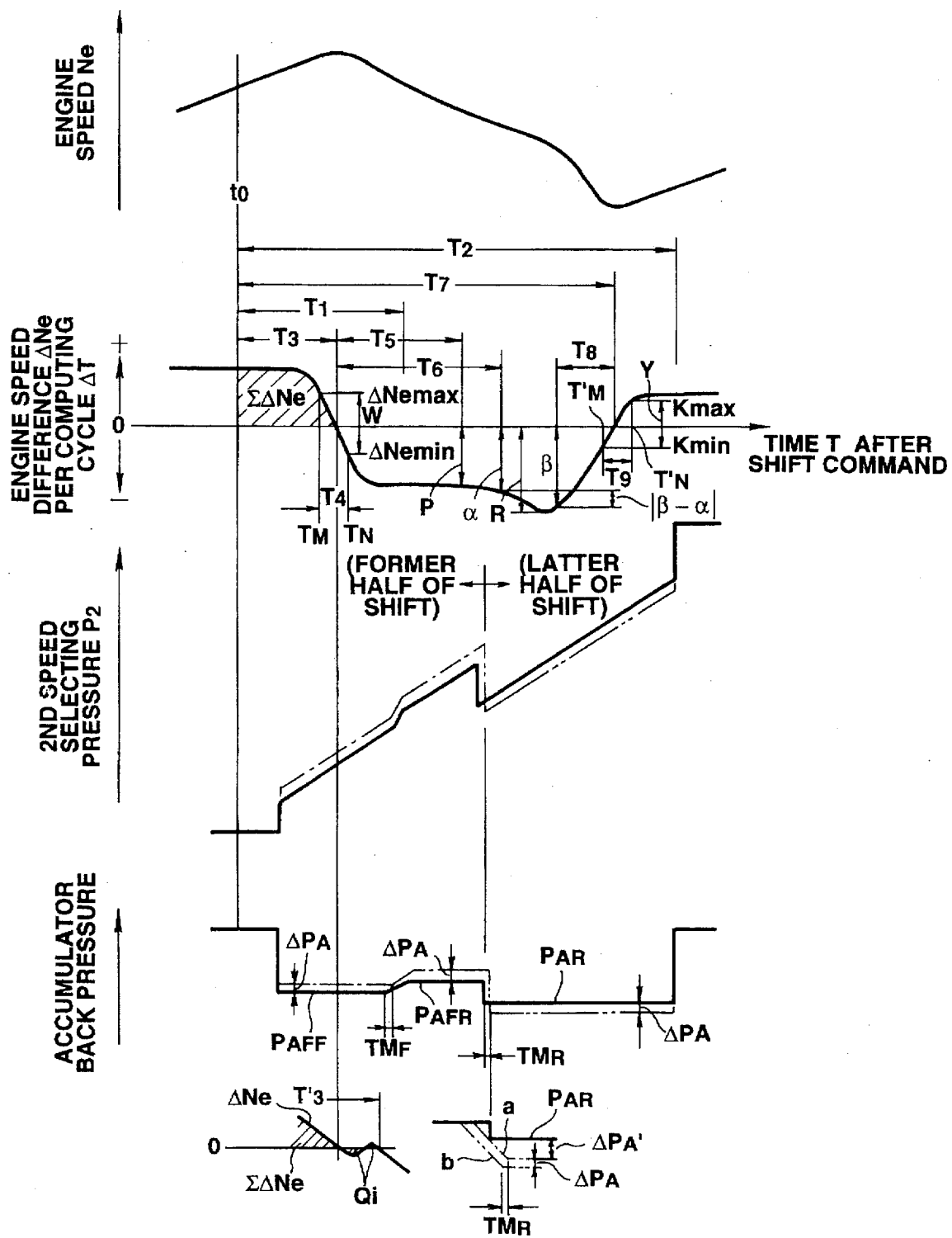
FIG. 14 is a view similar to FIG. 8, showing the method of recognizing waveform of a time variation in is the engine speed difference together with a self-learning control form of the accumulator back pressure.

At a subsequent step 124, a waveform of a time variation in the engine speed $N_e$ as illustrated in FIG. 14 is recognized according to the control program as shown in FIGS. 9–11. The steps 122–124 are continued until it is judged that the elapsed time T after occurrence of a shift command is equal to the set time $T_2$ covering a length from occurrence of a shift command to shift completion, and therefore, waveform recognition at the step 124 is executed every predetermined time $\Delta T$ at the step 123 until T is equal to or greater than $T_2$ ($T \geq T_2$) after occurrence of a shift command. Specifically, waveform recognition at the step 124 is as shown in FIGS. 9–11.

Figure 12:
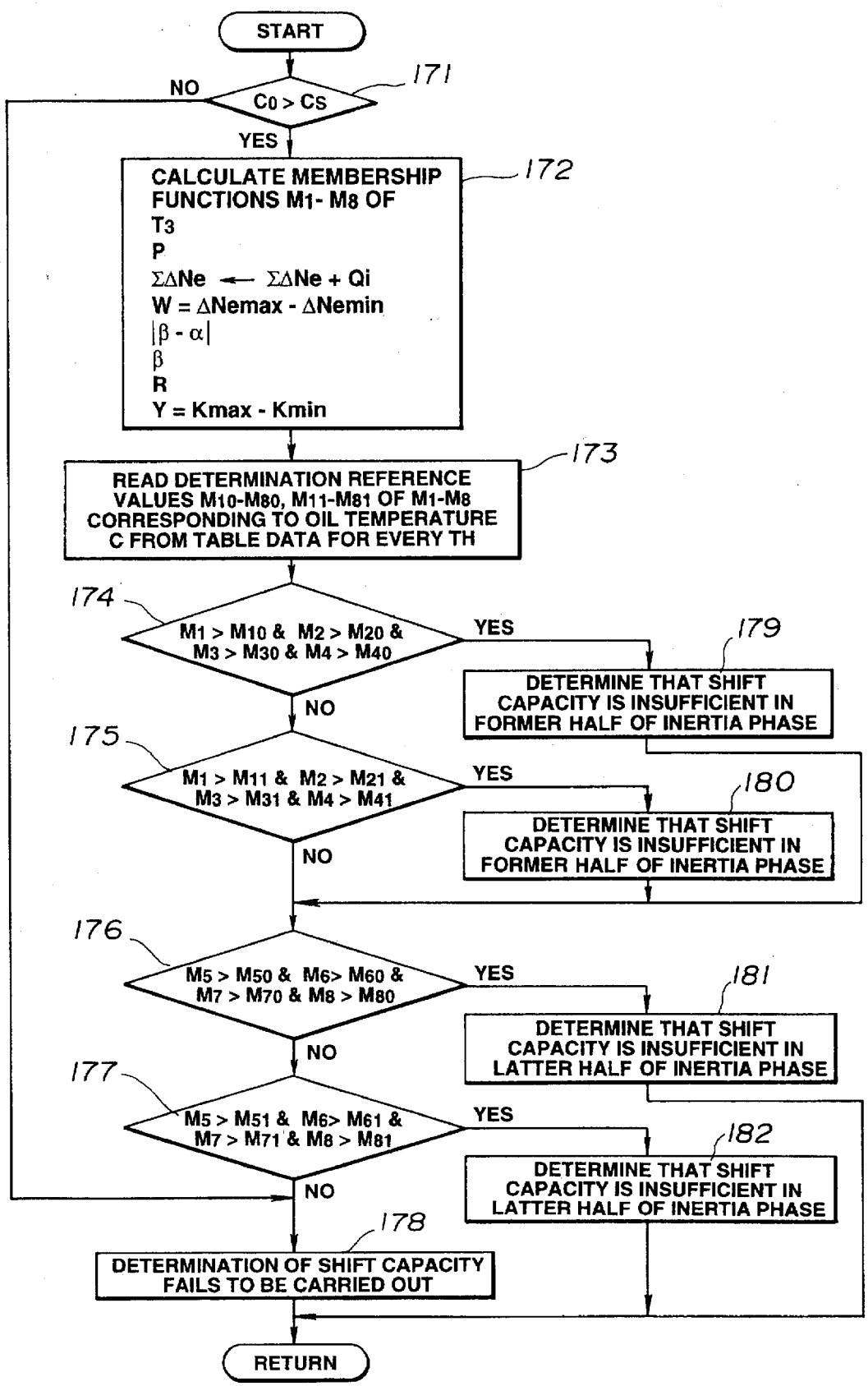
FIG. 12 is a view similar to FIG. 11, showing a subroutine for judging the propriety of the shift capacity.
Figure 13:
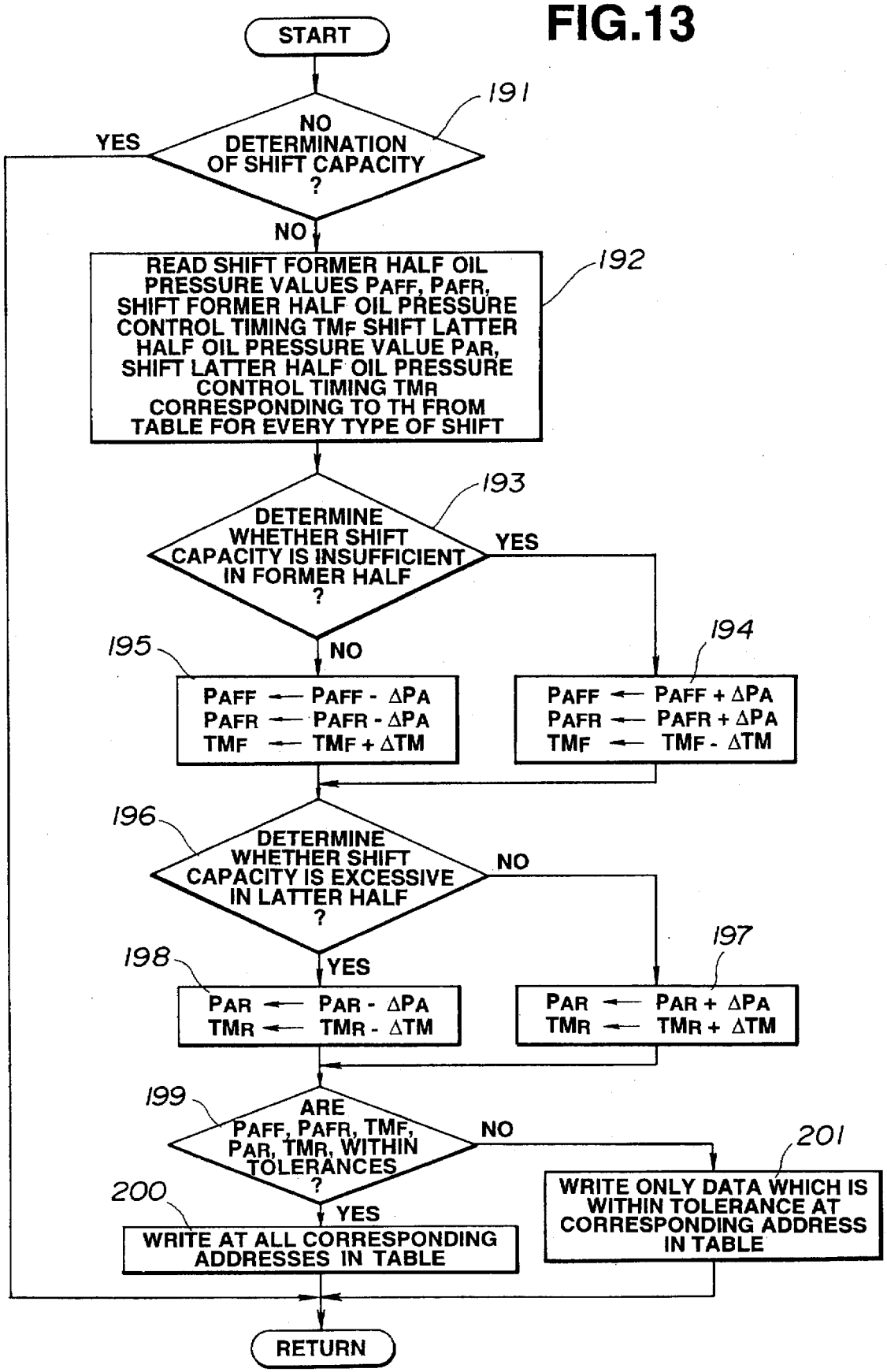
FIG. 13 is a view similar to FIG. 12, showing a subroutine for self-learning control of an accumulator back pressure.

When $T \geq T_2$ after occurrence of a shift command, propriety judgment of the shift capacity is carried out at a step 126 according to the control program as shown in FIG. 12, and self-learning control of a hydraulic pressure value for shift capacity control based on a result of propriety judgment is carried out at a step 127 according to the control program as shown in FIG. 13.

Referring to FIG. 14, a description will be made with regard to waveform recognition executed at the step 124 as shown in FIGS. 9–11. Here, in accordance with a shift command at a point $t_0$, the engine speed or prime mover revolution $N_e$ is varied as shown in FIG. 14 during shifting, having the engine speed difference $\Delta N_e$ per computing cycle $\Delta T$ in FIGS. 9–11 (Step 124), i.e. a time variation in the engine speed $N_e$, as shown in FIG. 14.

In this embodiment, a shift period is divided into two, i.e. former and latter halves, so as to individually judge excess and insufficiency of the shift capacity therein. For this reason, in the former half of the shift period, waveform recognition is carried out by:

1) a length of a shift response time $T_3$ between the shift command time $t_0$ and a point that the engine speed difference $\Delta N_e$ is changed from the positive to the negative for the last time within a first set time $T_1$ covering a length from the shift command point $t_0$ to shift commencement and not to shift completion, i.e. a point of $T_3$ in terms of an elapsed time after the shift command point $t_0$;

2) a value P of the engine speed difference $\Delta N_e$ at a point that a predetermined time $T_5$ elapsed after a point of the shift response time $T_3$ and within the former half of the shift period;

3) a sum $\Sigma\Delta N_e$ of the engine speed difference $\Delta N_e$ between the shift command point $t_0$ and the point of the shift response time $T_3$; and 4) an incline $W/T_4$ of the engine speed difference $\Delta N_e$ in the vicinity of the point of the shift response time $T_3$.

On the other hand, in the latter half of the shift period, waveform recognition is carried out by:

5) an absolute value of a difference in the engine speed difference $\Delta N_e$ between any two points between a point of the former half of the shift period and a point that the engine speed difference $\Delta N_e$ is changed from the negative to the positive for the first time within the latter half of the shift period, i.e. a point of a shift required time $T_7$ in terms of an elapsed time after the shift command point $t_0$, e.g. an absolute value $|\beta-\alpha|$ of a difference between a value $\alpha$ of the engine speed difference $\Delta N_e$ at a point after an elapsed of a time $T_6$ from the point of the shift response time $T_3$ and a value $\beta$ of the engine speed difference $\Delta N_e$ at a point before a predetermined time $T_8$ from the point of the shift required time $T_7$;

6) a value of the engine speed difference $\Delta N_e$ at any point between the point of the former half of the shift period and a point that the engine speed difference $\Delta N_e$ is changed from the negative to the positive at the first time in the latter half of the shift period, i.e. the point of a shift required time $T_7$ in terms of an elapsed time after the shift command point $t_0$, e.g. the value $\beta$ of the engine speed difference $\Delta N_e$ at a point before a predetermined time $T_8$ from the point of the shift required time $T_7$;

7) a minimum value R of the engine speed difference $\Delta N_e$ between the point that the engine speed difference $\Delta N_e$ is changed from the positive to the negative for the last time within the first set time $T_1$ covering a length from the shift command point $t_0$ to shift commencement and not to shift completion, i.e. the point of the shift response time $T_3$, and the point that the engine speed difference $\Delta N_e$ is changed from the negative to the positive for the first time before a lapse of the second set time $T_2$ covering a length from the shift command point $t_0$ to shift completion, i.e. the point of the shift required time $T_7$; and 8) an incline $Y/T_9$ of the engine speed difference $\Delta N_e$ in the vicinity of the point that the engine speed difference $\Delta N_e$ is changed from the negative to the positive for the first time after a lapse of the first set time $T_1$ covering a length from the shift command point $t_0$ to shift commencement and not to shift completion, and before a lapse of the second set time $T_2$ covering shift completion, i.e. the point of the shift required time $T_7$.

The incline $W/T_4$ is a ratio of a predetermined time $T_4$ between a point $T_M$ before M times and a point $T_N$ after N times in view of a reference point that the time $T_3$ elapsed after the shift command point $t_0$ to a difference W between a maximum value $\Delta N_{emax}$ and a minimum value $\Delta N_{emin}$ of the engine speed difference $\Delta N_e$ during the Time $T_4$, whereas the incline $Y/T_9$ is a ratio of a predetermined time $T_9$ between a point $T_M'$ before M' times and a point $T_N'$ after N' times in view of a reference point that the time $T_7$ elapsed after the shift command point $t_0$ to a difference Y between a maximum value $K_{max}$ and minimum value $K_{min}$ of the engine speed difference $\Delta N_e$ during the time $T_9$. Preferably, the first and second set times $T_1, T_2$ are varied in accordance with the throttle opening TH which participates in a shift operation.

It is presumed that when the shift response time $T_3$ is longer, the shift capacity or hydraulic pressure in the former half of the shift period is rather insufficient, that when the value P is smaller, the shift capacity in the former half of the shift period is rather insufficient, that when the sum $\Sigma\Delta N_e$ is greater, the shift capacity in the former half of the shift period is rather insufficient, and that when the incline $W/T_4$ is gentler, the shift capacity in the former half of the shift period is rather insufficient. Moreover, it is presumed that when the absolute value $|\beta-\alpha|$ is greater, the shift capacity in the latter half of the shift period is excessive, that the value $\beta$ is greater, the shift capacity in the latter half of the shift period is excessive, that when the minimum value R is smaller, the shift capacity in the latter half of the shift period is excessive, and that when the incline $Y/T_9$ is sharper, the shift capacity in the latter half of the shift period is excessive.

Based on the above logic, upon waveform recognition as shown in FIGS. 9–11, at a step 131, the engine speed difference $\Delta N_e$ is reset to 0 prior to calculation thereof. At a step 182, an engine speed read value $N_e$ is set to a present engine speed value $N_e$(NEW), and at a step 133, the engine speed difference $\Delta N_e$ is obtained by subtracting a previous engine speed value $N_e$(OLD) from the present engine speed value $N_e$(NEW). The engine speed difference $\Delta N_e$ is obtained every computing cycle $\Delta T$ as shown in FIGS. 9–11. The engine speed difference $\Delta N_e$ is a value per predetermined time $\Delta T$, thus corresponding to a time variation in the engine speed or prime mover revolution.

At a subsequent step 134, the engine speed difference $\Delta N_e$ before the predetermined time $T_8$ which fails to exceed the latter half of the shift period from the point of the shift required time $T_7$ is set to $\beta$. It is noted here that $\beta$ is 0 up to the point of the time $T_8$. At a step 135, it is checked whether or not the elapsed time T after occurrence of a shift command is less than the first set time $T_1$. During judgment of $T<T_1$ at the step 135, a step 137 is executed only once at a point that it is judged that the present engine speed difference $\Delta N_e$ is negative whereas the previous engine speed difference $\Delta N_e$(OLD) is positive at a step 136, i.e. a point that it is judged that the engine speed difference $\Delta N_e$ is changed from the positive to the negative. At the step 137, a value of the timer of T at the above point is set in the timer of $T_3$. Moreover, referring to FIG. 14, the time $T_N$ indicative of a computing point after N times from the above point is obtained by a formula $T_3+(N \times \Delta T)$, and the maximum value $\Delta N_{emax}$ and minimum value $\Delta N_{emin}$ of the engine speed difference $\Delta N_e$ are stored in the memory in going back to the computing point $T_M$ before M times from the present.

At steps 138 and 139, on the assumption that after being changed from the positive to the negative once when $T<T_1$ or before the shift response time $T_3'$ in FIG. 14, the engine speed difference $\Delta N_e$ is changed from the negative to the positive, then from the positive to the negative again, a frequency "i" is counted that the engine speed difference $\Delta N_e$ is changed from the positive to the negative when $T<T_1$, and a new memory of $Q_1$ is established to set the engine speed difference $\Delta N_e$ thereto. At a subsequent step 140, the minimum value R of the engine speed difference $\Delta N_e$ is reset to 0 for subsequent calculation to set the engine speed difference $\Delta N_e$ thereto.

Except for the point that it is judged at the step 136 that the engine speed difference $\Delta N_e$ is changed from the positive to the negative, control proceeds to a step 141 where it is checked whether or not setting of the timer of $T_3$ is finished at the step 137. If setting of the timer of $T_3$ is not finished, control proceeds to a step 142 where the engine speed difference $\Delta N_e$ is continuously added in a memory of $\Sigma \Delta N_e$, then returns to the main routine in FIG. 8. It is noted that $\Sigma \Delta N_e$ is an integrated value of the engine speed difference $\Delta N_e$ during a period from occurrence of a shift command to the point that the engine speed difference $\Delta N_e$ is changed from the positive to the negative for the first time when $T<T_1$, which is substantially identical to a shadowed area as shown in FIG. 14.

On the other hand, at the step 141, if it is judged that setting of the timer of $T_3$ is finished, control proceeds to a step 143 where the engine speed difference $\Delta N_e$ is added in the memory of $Q_1$. It is noted here that $Q_1$ should be added to $\Sigma \Delta N_e$ when the above assumption is realized, and corresponds to an integrated value of the engine speed difference $\Delta N_e$ between the point that the engine speed difference $\Delta N_e$ is changed from the positive to the negative for the first time when $T<T_1$ and the point that it is changed from the positive to the negative for the last time when $T<T_1$.

Referring to FIG. 10, at a step 144, it is checked whether or not the elapsed time T after occurrence of a shift command is within the $T_N$. While the elapsed time T after occurrence of a shift command is within the $T_N$, at steps 145–148, the maximum value $\Delta N_{emax}$ and minimum value $\Delta N_{emin}$ of the engine speed difference $\Delta N_e$ during the time $T_4$ in FIG. 14 are obtained in updating the maximum value $\Delta N_{emax}$ and minimum value $\Delta N_{emin}$ to the present engine speed difference $\Delta N_e$ in accordance with comparison with the present engine speed difference $\Delta N_e$, if necessary.

At subsequent steps 149 and 150, the engine speed difference $\Delta N_e$ at a point that the elapsed time T after occurrence of a shift command is equal to a sum of the shift response time $T_3$ and the predetermined time $T_5$ which fails to exceed the former half of the shift period is set to P. At steps 151 and 152, the engine speed difference $\Delta N_e$ at a point that the elapsed time T after occurrence of a shift command is equal to a sum of the shift response time $T_3$ and the predetermined time $T_6$ which extends to the latter half of the shift period is set to $\alpha$.

At subsequent steps 153–158, during a period after the elapsed time T after occurrence of a shift command is more than the first set time $T_1$ and before the timer of $T_7$ indicative of the shift required time is set, the following processing is carried out. That is, at steps 155 and 156, it is judged whether or not the present engine speed difference $\Delta N_e$ is smaller than the minimum value R of the engine speed difference $\Delta N_e$ during this period, and whenever a result of judgment is YES, the memory of R is updated to the present engine speed difference $\Delta N_e$. At steps 157 and 158, it is judged whether or not the present engine speed difference $\Delta N_e$ is positive, and the previous engine speed value $\Delta N_e$ (OLD) is negative, i.e. it is judged whether or not the engine speed difference $\Delta N_e$ is changed from the negative to the positive, and a value of the timer of T is set in the timer of $T_7$ at a point that this change occurs. Then, measurement of the shift required time comes to an end.

At the point that the timer of $T_7$ is set with the change of the engine speed difference $\Delta N_e$ from the negative to the positive at the steps 157 and 158, steps 159 and 160 are also executed. At the step 159, referring to FIG. 14, the maximum value $K_{max}$ and minimum value $K_{min}$ of the engine speed difference $\Delta N_e$ are stored in the memory in going back to the computing point $T_M'$ before M' times from the above point, and the time $T_N'$ indicative of the computing point after N' times from the above point is obtained by a formula $T_7+(N' \times \Delta T)$. At the step 160, the engine speed difference $\Delta N_e$ before the predetermined time $T_8$ which fails to exceed the latter half of the shift period from the point of the shift required time $T_7$ is set to $\beta$.

At subsequent steps 161–165, while the elapsed time T after occurrence of a shift command is within the $T_N'$, the maximum value $K_{max}$ and minimum value $K_{min}$ of the engine speed difference $\Delta N_e$ during the time $T_9$ in FIG. 14 are obtained in updating the maximum value $K_{max}$ and minimum value $K_{min}$ to the present engine speed difference $\Delta N_e$ in accordance with comparison with the present engine speed difference $\Delta N_e$, if necessary.

The step 126 in FIG. 8 executes the control program as shown in FIG. 12 based on the above waveform recognition so as to judge the propriety of the shift capacity. First, at a step 171, it is judged whether or not the transmission hydraulic fluid temperature C is higher than a set temperature Cs. If the transmission hydraulic fluid temperature C is not higher than the set temperature Cs, unstable engine output torque or unstable operation of the automatic transmission 2 appears, resulting in inaccurate propriety judgment of the shift capacity. Thus, without carrying out propriety judgment of the shift capacity, control proceeds to a step 178. On the other hand, if the transmission hydraulic fluid temperature C is higher than the set temperature Cs, propriety judgment of the shift capacity is carried out at steps 172–177.

Upon propriety judgment of the shift capacity, fuzzy membership functions concerning the shift response time $T_3$ in the former half of the shift period, the value P of the engine speed difference $\Delta N_e$ at the point that the predetermined time $T_5$ elapsed after the point of the shift response time $T_3$ and in the former half of the shift period, the sum $\Sigma \Delta N_e \leftarrow \Sigma \Delta N_e + Q_1$ of the engine speed difference $\Delta N_e$ between the shift command point $t_0$ and the point of the shift response time $T_3$, and the difference $W = \Delta N_{emax} - \Delta N_{emin}$ indicative of the incline $W/T_4$ of the engine speed difference $\Delta N_e$ in the vicinity of the point of the shift response time $T_3$ in FIG. 14 are previously established as shown in FIGS. 15A–15D. Moreover, fuzzy membership functions concerning the absolute value $|\beta-\alpha|$ of the difference of the engine speed difference values $\alpha$, $\beta$ at any two points in the latter half of the shift period, the engine speed difference value $\beta$ at any point in the latter half of the shift period, e.g. the point before the predetermined time $T_8$ from the point of the shift required time $T_7$, the minimum value R of the engine speed difference $\Delta N_e$ between the point of the shift response time $T_3$ and the point of the shift required time $T_7$, and the difference $Y=K_{max}-K_{min}$ indicative of the incline $Y/T_9$ of the engine speed difference $\Delta N_e$ in the vicinity of the point of the shift required time $T_7$ in FIG. 14 are previously established as shown in FIGS. 16A–16D. It is noted that the form of the fuzzy membership functions is experimentally determined every throttle opening TH or engine load in changing operating conditions of the automatic transmission 2 in various ways.

At the step 172 in FIG. 12, likely insufficiencies $M_1$, $M_2$, $M_3$, $M_4$ and likely excesses $M_5$, $M_6$, $M_7$, $M_8$ of the shift capacity are obtained out of the fuzzy membership functions illustrated in FIGS. 15A–15D and 16A–16D. At the subsequent step 173, insufficiency reference values $M_{10}$, $M_{20}$, $M_{30}$, $M_{40}$ for previously judging that the shift capacity is likely insufficient with respect to the respective fuzzy membership functions and excess reference values $M_{11}$, $M_{21}$, $M_{31}$, $M_{41}$ for previously judging that the shift capacity is likely excessive with respect to the respective fuzzy membership functions are read in the memory as illustrated in FIGS. 15A–15D. Moreover, excess reference values $M_{50}$, $M_{60}$, $M_{70}$, $M_{80}$ for judging that the shift capacity is likely excessive and insufficiency reference values $M_{51}$, $M_{61}$, $M_{71}$, $M_{81}$ for judging that the shift capacity is likely insufficient are read in the memory as illustrated in FIGS. 16A–16D. It is noted that the insufficiency reference values $M_{10}$, $M_{20}$, $M_{30}$, $M_{40}$, $M_{51}$, $M_{61}$, $M_{71}$, $M_{81}$ and excess reference values $M_{11}$, $M_{21}$, $M_{31}$, $M_{41}$, $M_{50}$, $M_{60}$, $M_{70}$, $M_{80}$ are previously established every throttle opening TH as table data of the transmission hydraulic fluid temperature C, and are obtained out of the transmission hydraulic fluid temperature C and the throttle opening TH in accordance with the table data.

At the subsequent step 174, it is checked whether or not the shift capacity in the former half of the inertia phase or shift period is insufficient based on judgment of $M_1 \geq M_{10}$, and $M_2 \geq M_{20}$, and $M_3 \geq M_{30}$, and $M_4 \geq M_{40}$. At the step 175, it is checked whether or not the shift capacity in the former half of the inertia phase or shift period is excessive based on judgment of $M_1 < M_{11}$, and $M_2 < M_{21}$, and $M_3 < M_{31}$, and $M_4 < M_{41}$. At the step 176, it is checked whether or not the shift capacity in the latter half of the inertia phase or shift period is excessive based on judgment of $M_5 \geq M_{50}$, and $M_6 \geq M_{60}$, and $M_7 \geq M_{70}$, and $M_8 \geq M_{80}$. At the step 177, it is checked whether or not the shift capacity in the latter half of the inertia phase or shift period is insufficient based on judgment of $M_5 < M_{51}$, and $M_6 < M_{61}$, and $M_7 < M_{71}$, and $M_8 < M_{81}$. If all results of judgment at the steps 174–177 are NO, the likely insufficiencies $M_1$, $M_2$, $M_3$, $M_4$ and likely excesses $M_5$, $M_6$, $M_7$, $M_8$ of the shift capacity are appropriate values between the corresponding insufficiency reference values and the corresponding excess reference values, respectively, so that control proceeds to a step 178 without carrying out judgment of the shift capacity.

At the step 174, if it is judged that $M_1 \geq M_{10}$, and $M_2 \geq M_{20}$, and $M_3 \geq M_{30}$, and $M_4 \geq M_{40}$, control proceeds to a step 179 where a result of judgment is output that the shift capacity in the former half of the inertia phase or shift period is insufficient. At the step 175, if it is judged that $M_1 < M_{11}$, and $M_2 < M_{21}$, and $M_3 < M_{31}$, and $M_4 < M_{41}$, control proceeds to a step 180 where a result of judgment is output that the shift capacity in the former half of the inertia phase or shift period is excessive. At the step 176, if it is judged that $M_5 \geq M_{50}$, and $M_6 \geq M_{60}$, and $M_7 \geq M_{70}$, and $M_8 \geq M_{80}$, control proceeds to a step 181 where a result of judgment is output that the shift capacity in the latter half of the inertia phase or shift period is excessive. At the step 177, if it is judged that $M_5 < M_{51}$, and $M_6 < M_{61}$, and $M_7 < M_{71}$, and $M_8 < M_{81}$, control proceeds to a step 182 where a result of judgment is output that the shift capacity in the latter half of the inertia phase or shift period is insufficient.

Figure 15A:
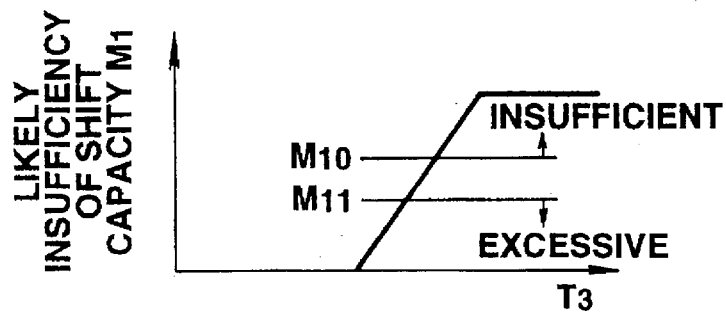
FIGS. 15A–15E are views similar to FIGS. 7A–7D, illustrating fuzzy membership functions for use on judgment of the propriety of the shift capacity in the former half of a shift period upon shift capacity control.
Figure 15B:
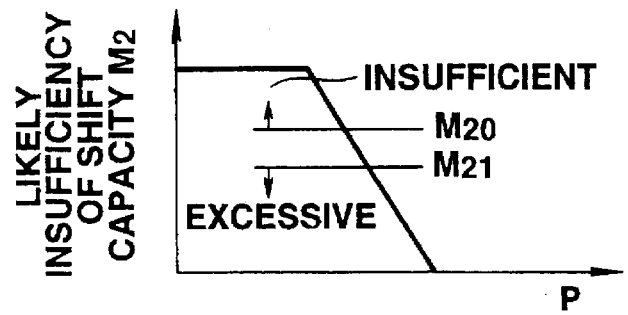
Figure 15C:
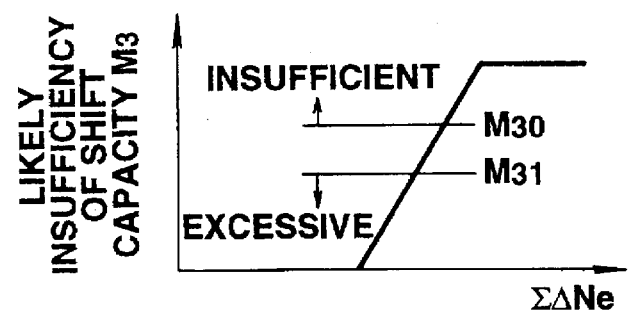
Figure 15D:
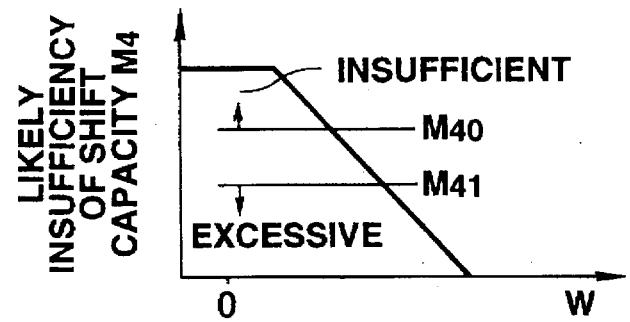
Figure 15E:
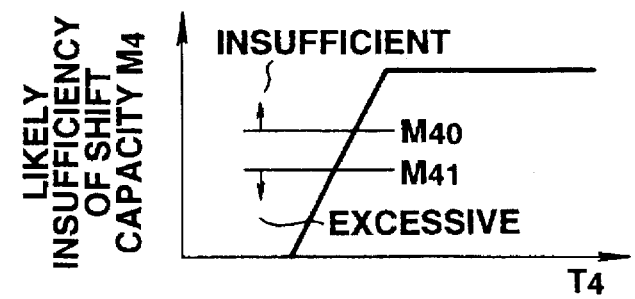
Figure 16A:
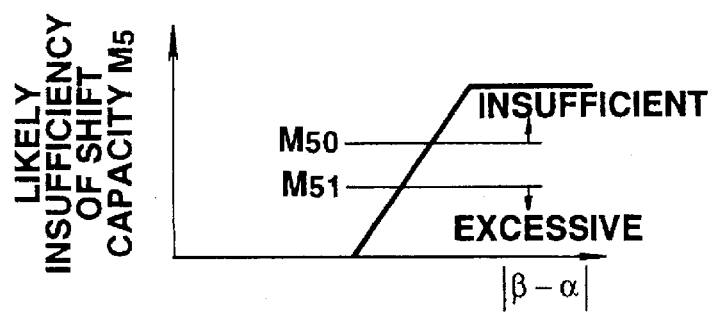
FIGS. 16A–16E are views similar to FIGS. 15A–15E, illustrating fuzzy membership functions for use on judgment of the propriety of the shift capacity in the latter half of the shift period upon shift capacity control.
Figure 16B:
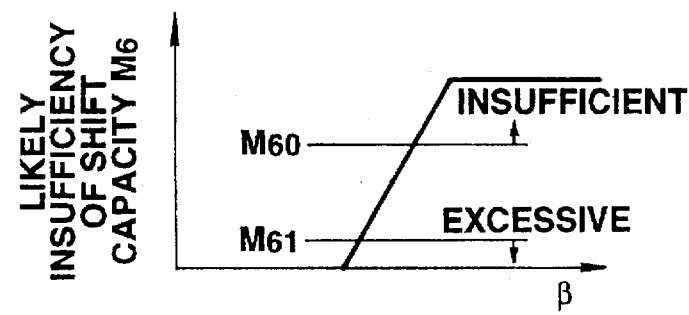
Figure 16C:
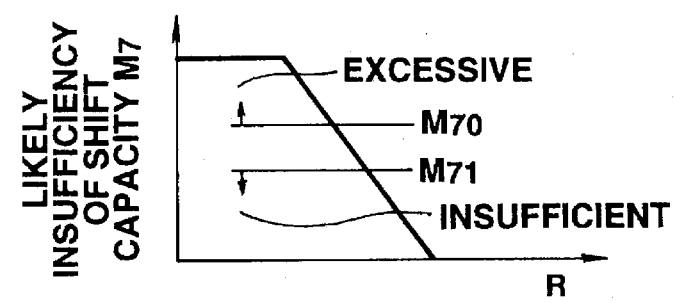
Figure 16D:
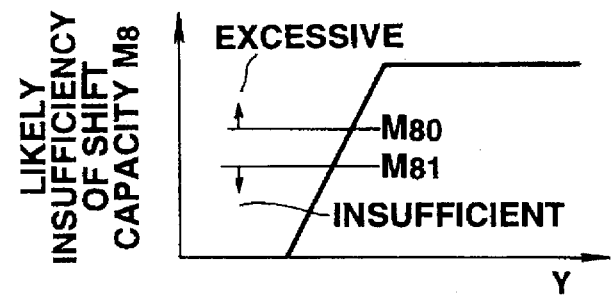
Figure 16E:
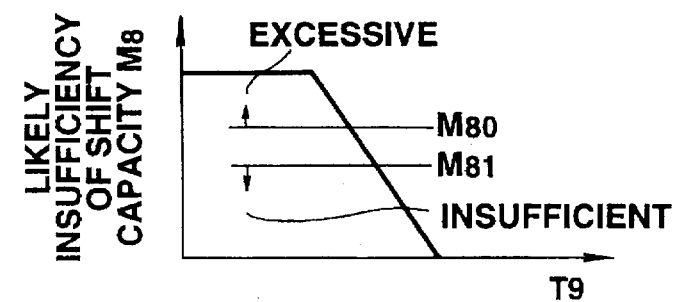

It is noted that FIG. 15D shows a fuzzy membership function concerning the difference W between the maximum value $\Delta N_{emax}$ and minimum value $\Delta N_{emin}$ of the engine speed difference $\Delta N_e$ during the predetermined time $T_4$ in FIG. 14, i.e. the incline of the engine speed difference $\Delta N_e$ in the vicinity of the point after a lapse of the time $T_3$. If W is put constant, and the time $T_4$ is measured with respect to this, the incline can be also expressed by the time $T_4$ as measured, so that the fuzzy membership function as shown in FIG. 15D may be replaced with that one concerning the time $T_4$ as shown in FIG. 15E. It is also noted that FIG. 16D shows a fuzzy membership function concerning the difference Y between the maximum value $K_{max}$ and minimum value $K_{min}$ of the engine speed difference $\Delta N_e$ during the predetermined time $T_9$ in FIG. 14, i.e. the incline of the engine speed difference $\Delta N_e$ in the vicinity of the point after a lapse of the time $T_7$. If Y is put constant, and the time $T_9$ is measured with respect to this, the incline can be also expressed by the time $T_9$ as measured, so that the fuzzy membership function as shown in FIG. 16D may be replaced with that one concerning the time $T_9$ as shown in FIG. 16E.

Based on the above results of shift capacity judgment, at the step 127 in FIG. 8, the control program as shown in FIG. 13 is executed to carry out self-learning control of a line pressure value, maintaining the shift capacity at an appropriate value. This self-learning control is carried out as follows if it is judged that judgment of the shift capacity is found at a step 191 in FIG. 13, i.e. the step 179, 180, 181 or 182 is executed without executing the step 178 in FIG. 12:

At a step 192, accumulator back pressures $P_{AFF}$, $P_{AFR}$, $P_{AR}$ each corresponding to the throttle opening TH, and a hydraulic pressure control timing $TM_F$ in the former half of the shift period and hydraulic pressure control timing $TM_R$ in the latter half of the shift period are read in the memory in accordance with the hydraulic pressure table established every type of shifting, e.g. shifting from the first speed to the second speed. It is noted that as shown in FIG. 14, $P_{AFF}$ indicates an accumulator back pressure in the first part of the former half of the shift period, $P_{AFR}$ indicates an accumulator back pressure in the last part of the former half of the shift period, and $P_{AR}$ indicates an accumulator back pressure in the latter half of the shift period. It is also noted that as shown in FIG. 14, the hydraulic pressure control timing $TM_F$ in the former half of the shift period serves to determine the boundary between the first and last parts with respect to adjustment of the accumulator back pressure in the former half of the shift period, whereas the hydraulic pressure control timing $TM_R$ in the latter half of the shift period serves to determine the start timing with respect to adjustment of the accumulator back pressure in the latter half of the shift period.

At a subsequent step 193, it is checked whether judgment is that the shift capacity is insufficient in the former half of the inertia phase or shift period, or that the shift capacity is excessive in the former half of the inertia phase or shift period. If judgment is that the shift capacity is insufficient, control proceeds to a step 194 where the accumulator back pressure $P_{AFF}$ in the first part of the former half of the shift period, and $P_{AFR}$ in the last part of the former half of the shift period are increased by $\Delta P_A$, respectively, and the hydraulic pressure control timing $TM_F$ in the former half of the shift period is lagged by $\Delta TM$. On the other hand, if judgment is that the shift capacity is excessive, control proceeds to a step 195 where the accumulator back pressure $P_{AFF}$ in the first part of the former half of the shift period, and $P_{AFR}$ in the last part of the former half of the shift period are decreased by $\Delta P_A$, respectively, and the hydraulic pressure control timing $TM_F$ in the former half of the shift period is advanced by $\Delta TM$.

At a subsequent step 196, it is checked whether judgment is that the shift capacity is insufficient in the latter half of the inertia phase or shift period, or that the shift capacity is excessive in the latter half of the inertia phase or shift period. If judgment is that the shift capacity is insufficient, control proceeds to a step 197 where the accumulator back pressure $P_{AR}$ in the latter half of the shift period is increased by $\Delta P_A$, and the hydraulic pressure control timing $TM_R$ in the latter half of the shift period is advanced by $\Delta TM$. On the other hand, if judgment is that the shift capacity is excessive, control proceeds to a step 198 where the accumulator back pressure $P_{AR}$ in the latter half of the shift period is decreased by $\Delta P_A$, and the hydraulic pressure control timing $TM_R$ in the latter half of the shift period is lagged by $\Delta TM$.

At a subsequent step 199, if it is judged that the corrected values $P_{AFF}$, $P_{AFR}$, $P_{AR}$, $TM_F$, $TM_R$ are within corresponding tolerances, respectively, control proceeds to a step 200 where data at corresponding addresses in the hydraulic pressure table mentioned at the step 192 are updated to the corrected values $P_{AFF}$, $P_{AFR}$, $P_{AR}$, $TM_F$, $TM_R$. On the other hand, if a result of judgment at the step 199 is NO, control proceeds to a step 201 where the corrected value out of the tolerance is excluded, and the others are written at the corresponding addresses in the hydraulic pressure table.

Thus, referring to FIG. 14, upon next shifting of the same type and with the same throttle opening TH, the accumulator back pressures $P_{AFF}$, $P_{AFR}$, $P_{AR}$ are modified as indicated by a one-dot chain line in the former half of the shift period, and two-dot chain line in the latter half thereof, so that the working pressure of the friction elements or second speed selecting pressure $P_2$ in FIG. 14 is changed from a value as indicated by a fully drawn line to values as indicated by the one-dot chain line and two-dot chain line, permitting control of the shift capacity at an appropriate value.

It is noted that referring to FIG. 14, when a degree of judgment that the shift capacity is excessive is more than a predetermined degree as indicated by $\Delta P_A'$, returning to the above shift capacity control as indicated by a two-dot chain line "b" can be carried out after largely decreasing the accumulator back pressure $P_{AR}$ as indicated by a one-dot chain line "a".

It is also noted that upon control of the shift capacity, in place of direct control of only a corresponding working pressure of the friction element by adjustment of the back pressure of the accumulator arranged in the engaging pressure circuit of each friction element as described in this embodiment, a value of the line pressure as a source pressure of the whole automatic transmission 2 can be adjusted.

Further, it is noted that upon propriety judgment of the shift capacity in the former half of the shift period, in place of the method at the steps 174 and 175, the following two methods can be adopted. One is such that when one or two or three of $M_1 \geq M_{10}$, $M_2 \geq M_{20}$, $M_3 \geq M_{30}$ and $M_4 \geq M_{40}$ are established, and one of $M_1 < M_{11}$, $M_2 < M_{21}$, $M_3 < M_{31}$ and $M_4 < M_{41}$ fails to be established among the remainder, a result of judgment is output that the shift capacity in the former half of the shift period is insufficient, whereas when the reverse relationship is established, a result of judgment is output that the shift capacity in the former half of the shift period is excessive. Another is such that when $M_1 \times M_2 \times M_3 \times M_4$ is greater than an insufficiency judgment reference value, a result of judgment is output that the shift capacity in the former half of the shift period is insufficient, and when $M_1 \times M_2 \times M_3 \times M_4$ is smaller than an excess judgment reference value, a result of judgment is output that the shift capacity in the former half of the shift period is excessive.

Furthermore, it is noted that upon propriety judgment of the shift capacity in the latter half of the shift period, in place of the method at the steps 176 and 177, the following two methods can be adopted. One is such that when one or two or three of $M_5 \geq M_{50}$, $M_6 \geq M_{60}$, $M_7 \geq M_{70}$ and $M_8 \geq M_{80}$ are established, and one of $M_5 < M_{51}$, $M_6 < M_{61}$, $M_7 < M_{71}$ and $M_8 < M_{81}$ fails to be established among the remainder, a result of judgment is output that the shift capacity in the latter half of the shift period is excessive, whereas when the reverse relationship is established, a result of judgment is output that the shift capacity in the latter half of the shift period is insufficient. Another is such that when $M_5 \times M_6 \times M_7 \times M_8$ is greater than an excess judgment reference value, a result of judgment is output that the shift capacity in the latter half of the shift period is excessive, and when $M_5 \times M_6 \times M_7 \times M_8$ is smaller than an insufficiency judgment reference value, a result of judgment is output that the shift capacity in the latter half of the shift period is insufficient.

Having described the present invention in connection with the preferred embodiments, it is noted that the present invention is not limited thereto, and various modifications and changes are possible without departing from the spirit of the present invention.

What is claimed is:

1. A system for controlling a shift capacity of an automatic transmission for a prime mover, the automatic transmission being shiftable by selective engagement of friction elements, the system comprising:

means for sensing a revolution of the prime mover and generating a revolution signal indicative of said revolution sensed;

means for determining a shift command to the automatic transmission and generating a shift command signal indicative of said shift command determined;

means for determining a state of a time variation in said revolution of the prime mover after said shift command signal is generated and generating a state signal indicative of said state determined;

means for determining a propriety of the shift capacity of the automatic transmission during a period of shifting thereof in response to said state signal and generating a propriety signal indicative of said propriety determined; and means for controlling an engagement capacity of the friction element to be operated during a subsequent period of shifting in response to said propriety signal.

2. A system as claimed in claim 1, wherein said engagement capacity controlling means include means for adjusting a line pressure pertinent to engagement of an entirety of the friction elements.

3. A system as claimed in claim 2, wherein said engagement capacity controlling means include means for directly adjusting a working pressure pertinent to engagement of the friction element to be operated.

4. A system as claimed in claim 1, wherein said state determining means determine said state in accordance with a length of a shift response time between and point of said shift command and a point that said time variation is changed from negative to positive for the first time after a lapse of a first set time covering a length from said point of said shift command to completion of shifting.

5. A system as claimed in claim 1, wherein said propriety determining means determine said propriety in accordance with a fuzzy membership function of said length of said shift response time.

6. A system as claimed in claim 4, wherein said state determining means determine said state in accordance with a sum of said time variation between a point that said time variation is changed from positive to negative for the last time within said first set time and said point that said time variation is changed from negative to positive for the first time before a lapse of said second set time.

7. A system as claimed in claim 5, wherein said propriety determining means determine said propriety in accordance with a fuzzy membership function of said sum of said time variation.

8. A system as claimed in claim 6, wherein said state determining means determine said state in accordance with an incline of said time variation in the vicinity of said point that said time variation is changed from positive to negative for the last time within said first set time.

9. A system as claimed in claim 7, wherein said propriety determining means determine said propriety in accordance with a fuzzy membership function of said incline of said time variation.

10. A system as claimed in claim 9, wherein said fuzzy membership functions of said length of said shift response time, said sum of said time variation, and said incline of said time variation are determined every load of the prime mover, respectively.

11. A system as claimed in claim 1, wherein said propriety determining means determine said propriety in connection with each of a plurality of parts of said period of shifting.

12. A system as claimed in claim 11, wherein said plurality of parts of said period of shifting include former and latter halves of said period of shifting.

13. A system as claimed in claim 12, wherein said state determining means determine said state in said former half of said period of shifting in accordance with a length of said shift response time between said point of said shift command and said point that said time variation is changed from positive to negative for the last time within said first set time.

14. A system as claimed in claim 13, wherein said propriety determining means determine said propriety in said former half of said period of shifting in accordance with a fuzzy membership function of said length of said shift response time.

15. A system as claimed in claim 13, wherein said state determining means determine said state in said former half of said period of shifting in accordance with a value of said time variation at a point that a predetermined time elapsed after said point that said time variation is changed from positive to negative for the last time within said first set time.

16. A system as claimed in claim 15, wherein said propriety determining means determine said propriety in said former half of said period of shifting in accordance with a fuzzy membership function of said value of said time variation.

17. A system as claimed in claim 15, wherein said state determining means determine said state in said former half of said period of shifting in accordance with a sum of said time variation between said point of said shift command and a point that said time variation is changed from positive to negative for the last time within said first set time.

18. A system as claimed in claim 16, wherein said propriety determining means determine said propriety in said former half of said period of shifting in accordance with a fuzzy membership function of said sum of said time variation.

19. A system as claimed in claim 17, wherein said state determining means determine said state in said former half of said period of shifting in accordance with an incline of said time variation in the vicinity of said point that said time variation is changed from positive to negative for the last time within said first set time.

20. A system as claimed in claim 19, wherein said propriety determining means determine said propriety in said former half of said period of shifting in accordance with a fuzzy membership function of said incline of said time variation.

21. A system as claimed in claim 12, wherein said state determining means determine said state in said latter half of said period of shifting in accordance with an absolute value of a difference in said time variation between any two points between a point of said former half of said period of shifting and a point that said time variation is changed from negative to positive for the first time within said latter half of said period of shifting.

22. A system as claimed in claim 21, wherein said propriety determining means determine said propriety in said latter half of said period of shifting in accordance with a fuzzy membership function of said absolute value of said difference in said time variation.

23. A system as claimed in claim 21, wherein said state determining means determine said state in said latter half of said period of shifting in accordance with a value of said time variation at any point between said point of said former half of said period of shifting and a point that said time variation is changed from negative to positive at the first time in said latter half of said period of shifting.

24. A system as claimed in claim 23, wherein said propriety determining means determine said propriety in said latter half of said period of shifting in accordance with a fuzzy membership function of said value of said any point.

25. A system as claimed in claim 23, wherein said state determining means determine said state in said latter half of said period of shifting in accordance with a minimum value of said time variation between said point that said time variation is changed from positive to negative for the last time within said first set time and a point that said time variation is changed from negative to positive for the first time before a lapse of said second set time.

26. A system as claimed in claim 25, wherein said propriety determining means determine said propriety in said latter half of said period of shifting in accordance with a fuzzy membership function of said minimum value of said time variation.

27. A system as claimed in claim 25, wherein said state determining means determine said state in said latter half of said period of shifting in accordance with an incline of said time variation in the vicinity of said point that said time variation is changed from negative to positive for the first time after a lapse of said first set time, and before a lapse of said second set time.

28. A system as claimed in claim 27, wherein said propriety determining means determine said propriety in said latter half of said period of shifting in accordance with a fuzzy membership function of said incline of said time variation.

29. A method of controlling a shift capacity of an automatic transmission for a prime mover, the automatic transmission being shiftable by selective engagement of friction elements, the method comprising the steps of:

sensing a revolution of the prime mover and generating a revolution signal indicative of said revolution sensed;

determining a shift command to the automatic transmission and generating a shift command signal indicative of said shift command determined;

determining a state of a time variation in said revolution of the prime mover after said shift command signal is generated and generating a state signal indicative of said state determined;

determining a propriety of the shift capacity of the automatic transmission during a period of shifting thereof in response to said state signal and generating a propriety signal indicative of said propriety determined; and controlling an engagement capacity of the friction element to be operated during a subsequent period of shifting in response to said propriety signal.

30. A method as claimed in claim 29, wherein said engagement capacity controlling step is carried out by adjusting a line pressure pertinent to engagement of an entirety of the friction elements.

31. A method as claimed in claim 30, wherein said engagement capacity controlling step is carried out by directly adjusting a working pressure pertinent to engagement of the friction element to be operated.

32. A method as claimed in claim 29, wherein said state determining step is carried out in accordance with a length of a shift response time between a point of said shift command and point that said time variation is changed from negative to positive for the first time after a lapse of a first set time covering a length from said point of said shift command to commencement of shifting, and before a lapse of a second set time covering a length from said point of said shift command to completion of shifting.

33. A method as claimed in claim 32, wherein said propriety determining step is carried out in accordance with a fuzzy membership function of said length of said shift response time.

34. A method as claimed in claim 32, wherein said state determining step is carried out in accordance with a sum of said time variation between a point that said time variation is changed from positive to negative for the last time within said first set time and said point that said time variation is changed from negative to positive for the first time before a lapse of said second set time.

35. A method as claimed in claim 34, wherein said propriety determining step is carried out in accordance with a fuzzy membership function of said sum of said time variation.

36. A method as claimed in claim 34, wherein said state determining step is carried out in accordance with an incline of said time variation in the vicinity of said point that said time variation is changed from positive to negative for the last time within said first set time.

37. A method as claimed in claim 36, wherein said propriety determining step is carried out in accordance with a fuzzy membership function of said incline of said time variation.

38. A method as claimed in claim 37, wherein said fuzzy membership functions of said length of said shift response time, said sum of said time variation, and said incline of said time variation are determined every load of the prime mover, respectively.

39. A method as claimed in claim 29, wherein said propriety determining step is carried out in connection with each of a plurality of parts of said period of shifting.

40. A method as claimed in claim 39, wherein said plurality of parts of said period of shifting include former and latter halves of said period of shifting.

41. A method as claimed in claim 40, wherein said state determining step is carried out in said former half of said period of shifting in accordance with a length of said shift response time between said point of said shift command and said point that said time variation is changed form positive to negative for the last time within said first set time.

42. A method as claimed in claim 41, wherein said propriety determining step is carried out in said former half of said period of shifting in accordance with a fuzzy membership function of said length of said shift response time.

43. A method as claimed in claim 41, wherein said state determining step is carried out in said former half of said period of shifting in accordance with a value of said time variation at a point that a predetermined time elapsed after said point that said time variation is changed from positive to negative for the last time within said first set time.

44. A method as claimed in claim 43, wherein said propriety determining step is carried out in said former half of said period of shifting in accordance with a fuzzy membership function of said value of said time variation.

45. A method as claimed in claim 43, wherein said state determining step is carried out in said former half of said period of shifting in accordance with a sum of said time variation between said point of said shift command and a point that said time variation is changed form positive to negative for the last time within said first set time.

46. A method as claimed in claim 45, wherein said propriety determining step is carried out in said former half of said period of shifting in accordance with a fuzzy membership function of said sum of said time variation.

47. A method as claimed in claim 45, wherein said state determining step is carried out in said former half of said period of shifting in accordance with an incline of said time variation in the vicinity of said point that said time variation is changed from positive to negative for the last time within said first set time.

48. A method as claimed in claim 47, wherein said propriety determining step is carried out in said former half of said period of shifting in accordance with a fuzzy membership function of said incline of said time variation.

49. A method as claimed in claim 47, wherein said state determining step is carried out in said latter half of said period of shifting in accordance with an absolute value of a difference in said time variation between any two points between a point of said former half of said period of shifting and a point that said time variation is changed from negative to positive for the first time within said latter half of said period of shifting.

50. A method as claimed in claim 49, wherein said propriety determining step is carried out in said latter half of said period of shifting in accordance with a fuzzy membership function of said absolute value of said difference in said time variation.

51. A method as claimed in claim 49, wherein said state determining step is carried out in said latter half of said period of shifting in accordance with a value of said time variation at any point between said point of said former half of said period of shifting and a point that said time variation is changed from negative to positive at the first time in said latter half of said period of shifting.

52. A method as claimed in claim 51, wherein said propriety determining step is carried out in said latter half of said period of shifting in accordance with a fuzzy membership function of said value of said any point.

53. A method as claimed in claim 51, wherein said state determining step is carried out in said latter half of said period of shifting in accordance with a minimum value of said time variation between said point that said time variation is changed from positive to negative for the last time within said first set time and a point that said time variation is changed from negative to positive for the first time before a lapse of said second set time.

54. A method as claimed in claim 53, wherein said propriety determining step is carried out in said latter half of said period of shifting in accordance with a fuzzy membership function of said minimum value of said time variation.

55. A method as claimed in claim 53, wherein said state determining step is carried out in said latter half of said period of shifting in accordance with an incline of said time variation in the vicinity of said point that said time variation is changed from negative to positive for the first time after a lapse of said first set time, and before a lapse of said second set time.

56. A method as claimed in claim 55, wherein said propriety determining step is carried out in said latter half of said period of shifting in accordance with a fuzzy membership function of said incline of said time variation.

57. A system for controlling a shift capacity of an automatic transmission for a prime mover, the automatic transmission for a prime mover, the automatic transmission being shiftable by selective engagement of friction elements, the system comprising:
- means for sensing a revolution of the prime mover and generating a revolution signa indicative of said revolution sensed;
- means for determining a shift command to the automatic transmission and generating a shift command signal indicative of said shift command determined;
- means for determining a time variation in said revolution of the prime mover after said shift command signal is generated and generating a time variation signal indicative of said time variation determined;
- means for determining a propriety of the shift capacity of the automatic transmission during a period of shifting thereof in response to said time variation signal and generating a propriety signal indicative of said propriety determined; and
- means for controlling an engagement capacity of the friction element to be operated during a subsequent period of shifting in response to said propriety signal.

58. A method of controlling a shift capacity of an automatic transmission for a prime mover, the automatic transmission being shiftable by selective engagement of friction elements, the method comprising the steps of:
- sensing a revolution of the prime mover and generating a revolution signal indicative of said revolution sensed;
- determining a shift command to the automatic transmission and generating a shift command signal indicative of said shift command determined;
- determining a time variation in said revolution of the prime mover after said shift command signal is generated and generating a time variation signal indicative of said time variation determined;
- determining a propriety of the shift capacity of the automatic transmission during a period of shifting thereof in response to said time variation signal and generating a propriety signal indicative of said propriety determined; and
- controlling an engagement capacity of the friction element to be operated during a subsequent period of shifting in response to said propriety signal.

59. A system for controlling a shift capacity of an automatic transmission for a prime mover, the automatic transmission being shiftable by selective engagement of friction elements, the system comprising;
- means for sensing a revolution of the prime mover and generating a revolution signal indicative of said revolution sensed;
- means for determining a shift command to the automatic transmission and generating a shift command signal indicative of said shift command determined;
- means for determining a state of a time variation in said revolution of the prime mover after said shift command signal is generated and generating a state signal indicative of said state determined, said state determining means determining said state in accordance with a length of a shift response time between a point of said shift command and a point that said time variation is changed from a negative to positive for the first time after a lapse of a first set time covering a length from said point of said shift command to commencement of shifting, and before a lapse of a second set time covering a length from said point of said shift command to completion of shifting;
- means for determining a propriety of the shift capacity of the automatic transmission during a period of shifting thereof in response to said state signal and generating a propriety signal indicative of said propriety determined; and
- means for controlling an engagement capacity of the friction element to be operated during a period of shifting of the automatic transmission in response to said propriety signal.

60. A method of controlling a shift capacity of an automatic transmission for a prime mover, the automatic transmission for a prime mover, the automatic transmission being shiftable by selective engagement of friction elements, the method comprising the steps of:
- sensing a revolution of the prime mover and generating a revolution signal indicative of said revolution sensed;
- determining a shift command to the automatic transmission and generating a shift command signal indicative of said shift command determined;
- determining a state of a time variation in said revolution of the prime mover after said shift command signal is generated and generating a state signal indicative of said state determined, said state determining step being carried out in accordance with a length of a shift response time between a point of said shift command and a point that said time variation is changed form negative to positive for the first time after a lapse of a first set time covering a length from said point of said shift command to commencement of shifting, and before a lapse of a second set time covering a length from said point of said shift command to completion of shifting;
- determining a propriety of the shift capacity of the automatic transmission during a period of shifting thereof in response to said state signal and generating a propriety signal indicative of said propriety determined; and
- controlling an engagement capacity of the friction element to be operated during a period of shifting of the automatic transmission in response to said propriety signal.

* * * * *